US012291301B2

(12) United States Patent
Zappa et al.

(10) Patent No.: US 12,291,301 B2
(45) Date of Patent: May 6, 2025

(54) CONTAINER ADAPTER PLATE FOR USE WITH AN ATTACHMENT APPARATUS FOR SECURELY ATTACHING OBJECTS TO A BICYCLE FRAME

(71) Applicant: ZAPPAWHEELS LLC, Chicago, IL (US)

(72) Inventors: John Zappa, Chicago, IL (US); Marta Guerrero Merino, Chicago, IL (US); Thomas Chiang, Glencoe, IL (US); David Filicicchia, West Chicago, IL (US); David Zappa, Wexford, PA (US)

( * ) Notice: Subject to any disclaimer, the term of this patent is extended or adjusted under 35 U.S.C. 154(b) by 227 days.

(21) Appl. No.: 18/123,416

(22) Filed: Mar. 20, 2023

(65) Prior Publication Data

US 2023/0249773 A1     Aug. 10, 2023

Related U.S. Application Data

(63) Continuation-in-part of application No. 17/382,100, filed on Jul. 21, 2021, now Pat. No. 11,613,322, which is a continuation-in-part of application No. 16/698,672, filed on Nov. 27, 2019, now Pat. No. 11,084,547.

(51) Int. Cl.
*B62J 7/04*     (2006.01)
*B62J 9/23*     (2020.01)
*B62J 9/24*     (2020.01)
*B62J 9/27*     (2020.01)
*B62J 9/40*     (2020.01)

(52) U.S. Cl.
CPC . *B62J 7/04* (2013.01); *B62J 9/23* (2020.02); *B62J 9/24* (2020.02); *B62J 9/27* (2020.02); *B62J 9/40* (2020.02)

(58) Field of Classification Search
CPC ......... B62J 9/24; B62J 9/23; B62J 9/40; B62J 9/27; B62J 7/04; B62J 7/08; B62J 9/26; B62J 9/00
USPC ................................ 224/419, 413, 415, 421
See application file for complete search history.

(56) References Cited

U.S. PATENT DOCUMENTS

| | | | | |
|---|---|---|---|---|
| 1,260,937 | A | * | 3/1918 | Muller, Jr. ................. B62J 7/04 224/450 |
| 4,739,637 | A | * | 4/1988 | Finkel ................. E05B 73/0082 248/553 |
| 7,299,667 | B1 | * | 11/2007 | Miresmaili ............. E05G 1/005 109/51 |
| 10,787,216 | B2 | * | 9/2020 | Visenzi ...................... B62J 7/08 |
| 11,890,996 | B2 | * | 2/2024 | Jackson ................. B60R 11/06 |
| 2008/0073396 | A1 | * | 3/2008 | Chiang ..................... B62J 9/23 280/202 |

(Continued)

OTHER PUBLICATIONS

JP 2004268670 A; "Attaching / Detaching Structure of Storage Member and Bicycle With Storage Member"; Yoshida Nobuyuki; Sep. 30, 2004 (Year: 2004).*

(Continued)

*Primary Examiner* — Nathan J Newhouse
*Assistant Examiner* — Lester L Vanterpool
(74) *Attorney, Agent, or Firm* — Eugenio J. Torres-Oyola; Victor Rodriguez-Reyes; Rafael Rodriguez-Muriel

(57) ABSTRACT

A container adapter plate having two layers that is adapted for use with an attachment apparatus and/or system for securely attaching objects to a bicycle frame.

13 Claims, 22 Drawing Sheets

(56) References Cited

U.S. PATENT DOCUMENTS

2012/0145759 A1* 6/2012 Shih .......................... B62J 7/00
224/412

OTHER PUBLICATIONS

EP 4008618 A1; "Luggage Holder System for Mounting Two Pieces of Luggage and Luggage Holder Assembly", Rutjens, Tessa; Jun. 8, 2022 (Year: 2022).*
JP 2001354178 A; Installation Structure for Basket for Vehicle; Ikeda, Hiroshi; Dec. 25, 2001 (Year: 2001).*

* cited by examiner

CONTAINER ADAPTER PLATE FOR USE WITH AN ATTACHMENT APPARATUS FOR SECURELY ATTACHING OBJECTS TO A BICYCLE FRAME

RELATED APPLICATIONS

This application is a continuation-in-part of, and claims the benefit of priority to, U.S. patent application Ser. No. 17/382,100, filed on Jul. 21, 2021, entitled "Apparatus and/or System for Securely Attaching Objects to a Bicycle Frame", which is a continuation-in-part of U.S. patent application Ser. No. 16/698,672, filed on Nov. 27, 2019, entitled "Apparatus and/or System for Securely Attaching Objects to a Bicycle Frame", the contents of which are hereby incorporated by reference.

STATEMENT REGARDING FEDERALLY SPONSORED RESEARCH AND DEVELOPMENT

N/A

BACKGROUND OF THE DISCLOSURE

Field of the Invention

The present application relates to a container adapter plate for use with an attachment apparatus and/or system for securely attaching objects to a bicycle frame.

Background

Bicycle commuting is an increasingly popular form of urban transportation. A common challenge with bicycle commuting, however, is transporting personal belongings while riding. For instance, a rider may have a u-lock, keys, phone, wallet, money, spare tube, patch kit and/or other items. All these possessions need to be easily secured without encumbering the rider or compromising his/her safety.

U-shaped locks present a special challenge since it is heavy, relatively large, an unusual shape and in many instances dirty. Traditional forms of carrying U-shaped locks, such as plastic brackets, require the rider to fit the lock to the bracket each time, they want to transport the lock. The bracket also takes up valuable space on the frame of the bike usually requiring the rider to give up a water bottle mount. Made from plastic, the brackets inevitable break from all the vibration typically present in riding a bike. Additionally, available methods of carrying U-shaped locks do not hold them in place in the x, y and z dimensions, thus permitting them to move and rattle.

Some riders use a bungee cord to secure the lock to a rack mounted on the rear of the bike. This again takes time to secure the lock and most annoyingly, the lock, which is metal bounces on the metal rack, thereby creating a rattling noise during the entire ride. Other riders have resorted to looping the lock over their front handlebars, which is an inherently dangerous situation given the movement of a large metal object inches from the rider's face and body.

Moreover, to carry items such as clothing or groceries, many individuals attach a container such as a milk cartons, wooden boxes, or wire baskets to the rear rack of their bicycle. One of the primary challenges with this approach is that the container is fixed to the rack and cannot be easily removed. Additionally, there is no adjustability should the placement of the container interfere with the rider while seated on the bicycle.

Accordingly, there is a need for an attachment apparatus and/or system for securely attaching objects to a bicycle frame that has the capability of holding said objects in place, thus preventing them from moving and rattling. Additionally, there is a need for such an apparatus and/or system that is also durable, easy to use, does not take up too much space, does not compromise the safety of the rider; and does not impede the rider's movements. Lastly, there is also a need for a mechanism for attaching containers to the rear of a bicycle that 1) provides variability on the placement of the container in x and y directions and 2) includes quick release fastening to control motion in the z direction.

While certain aspects of conventional technologies have been discussed to facilitate disclosure of the invention, Applicant in no way disclaims these technical aspects, and it is contemplated that the claimed invention may encompass one or more of the conventional technical aspects discussed herein. In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

SUMMARY

The present disclosure relates to a container adapter plate for use with an attachment apparatus for securely attaching objects to a bicycle frame, comprising: a lower layer; an upper layer; wherein the lower layer and the upper layer are adhered to each other; wherein the lower layer includes a first end and a second end that are opposite to each other, and a first side and a second side that are opposite to each other; wherein the lower layer includes one or more openings, each of which are adapted to receive a T-nut and a corresponding screw; wherein the one or more openings in the lower layer are arranged in a pattern; wherein the lower layer is configured to fit within a bicycle transport platform that comprises a base with raised edges; wherein the raised edges in the base of the transport platform include one or more cutout portions; wherein the second side of the lower layer includes an extension that is adapted to fit within one of the cutout portions of the transport platform; wherein the upper layer includes a first side and a second side that are opposite to each other, and a first end and a second end that are opposite to each other; wherein the upper layer includes one or more openings that are adapted to receive the T-nut and the corresponding screw; wherein the one or more openings in the upper layer are arranged in a pattern; wherein the upper layer includes a first extended portion adapted to extend over one of the raised edges in the base of the transport platform; and wherein the first extended portion of the upper layer comprises a latching mechanism adapted to lock the upper layer with the base of the transport platform.

The present disclosure may address one or more of the problems and deficiencies of the prior art discussed above. However, it is contemplated that the disclosure may prove useful in addressing other problems and deficiencies in several technical areas. Therefore, the claimed invention should not necessarily be construed as limited to addressing any of the particular problems or deficiencies discussed herein.

BRIEF DESCRIPTION OF THE DRAWINGS

These and other features, aspects, and advantages of the present invention will become better understood with regard to the following description, appended claims and accompanying drawings where:

DETAILED DESCRIPTION

Figure 1:
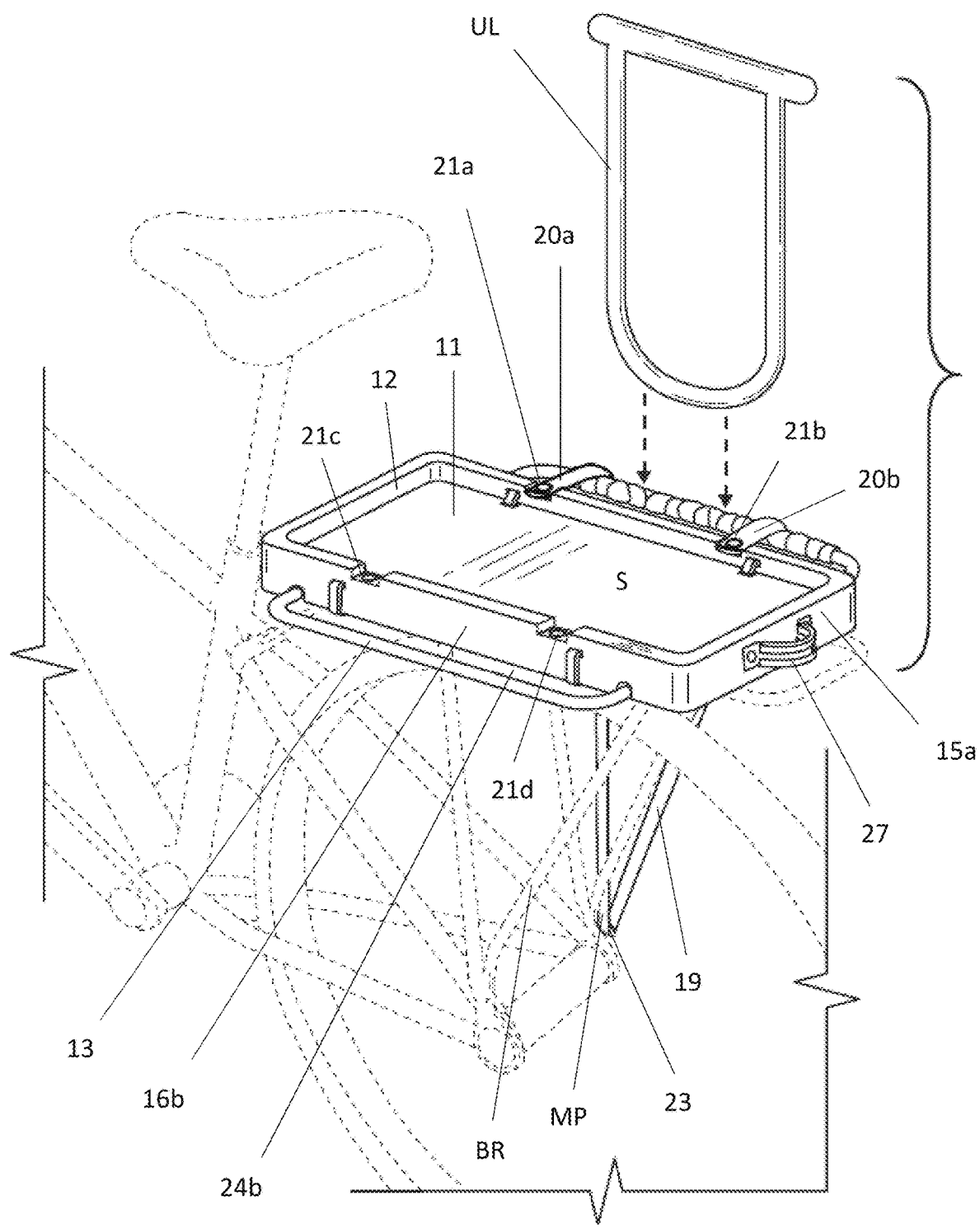
FIG. 1 shows a left-side perspective view of the attachment apparatus and/or system for securely attaching objects to a bicycle frame, in accordance with principles of the present disclosure.

In the Summary above, the Description below, and in the accompanying drawings, reference is made to particular features of the present disclosure. It is to be understood that the disclosure includes possible combinations of such particular features. For example, where a particular feature is disclosed in the context of a particular aspect or exemplary embodiment, or a particular claim, that feature can also be used, to the extent possible, in combination with and/or in the context of other particular aspects and exemplary embodiments, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 and/or more than 1.

The term "mechanical features" or "mechanical coupled" is used herein to mean features of a component, mechanical or geometric, which have a functional purpose of attaching or linking that component to one or more other components with compatible or corresponding mechanical features. An example of a mechanical feature is a slot in a component, where said slot is designed to accept a tab from another component and the union of the slot and tab from the two components effectively links, attaches, fixes, and/or locks the components together. The term "mechanical features" refers to, but is not limited to: clips, hooks, hook and loop fasteners, slot and tabs, all male and female fasteners, screws, bolts, nuts, holes that have been tapped, latches, pins, etc.

While the specification will conclude defining the features of exemplary embodiments of the disclosure that are regarded as novel, it is believed that the disclosure will be better understood from a consideration of the following description in conjunction with the figures, in which like reference numerals are carried forward.

FIG. 1 shows a left-side perspective view of the attachment apparatus and/or system for securely attaching objects to a bicycle frame, in accordance with principles of the present disclosure. The attachment apparatus and/or system for securely attaching objects to a bicycle frame comprises a transport platform 10 that is configured to be attached to the top of a bicycle rack BR. The transport platform 10, in turn, comprises a base 11 with raised edges 12 around its entire perimeter; and a rail 13 that extends from two sides of the base 11. The base 11 is preferably rectangular in shape and has rounded edges; but may also be configured to have any other shape. In a preferred embodiment, the base 11 includes a first end 15a and a second end 15b that are parallel to each other and have the same length; and a first side 16a and a second side 16b that are parallel to each other and have the same length; wherein the length of the first and second sides 16a, 16b is greater than the length of the first and second ends 15a, 15b. The base 11 further comprises one or more holes 14a-14l that cross through the surface or sides 16a, 16b of the base 11 that may be used to 1) either secure the transport platform 10 to the bicycle rack BR via one or more zip ties ZT; or 2) to serve as drainage for the base 11, in the event that water accumulates on the top surface of the base 11. The one or more holes 14a-14l, are preferably located on the first and second sides 16a, 16b of the base 11 and on a corresponding nearby location on the surface S of the base 11 to allow for the tying of the base 11 to the bicycle rack BR via zip ties ZT or any equivalent thereof, including, but not limited to, cable ties. In other words, the one or more holes on the surface S of the base 11 should be adjacent to the corresponding one or more holes on the first and second sides 16a, 16b of the base 11 in order to facilitate the tying of the base 11 to the bicycle rack BR via zip ties ZT. It should be noted that holes 14a-14l may be used for both drainage and securing of the base 11 to the bicycle rack BR. It must also be noted that the base 11 can be manufactured from metal, plastic, wood or any other durable material with similar properties.

Figure 7A:
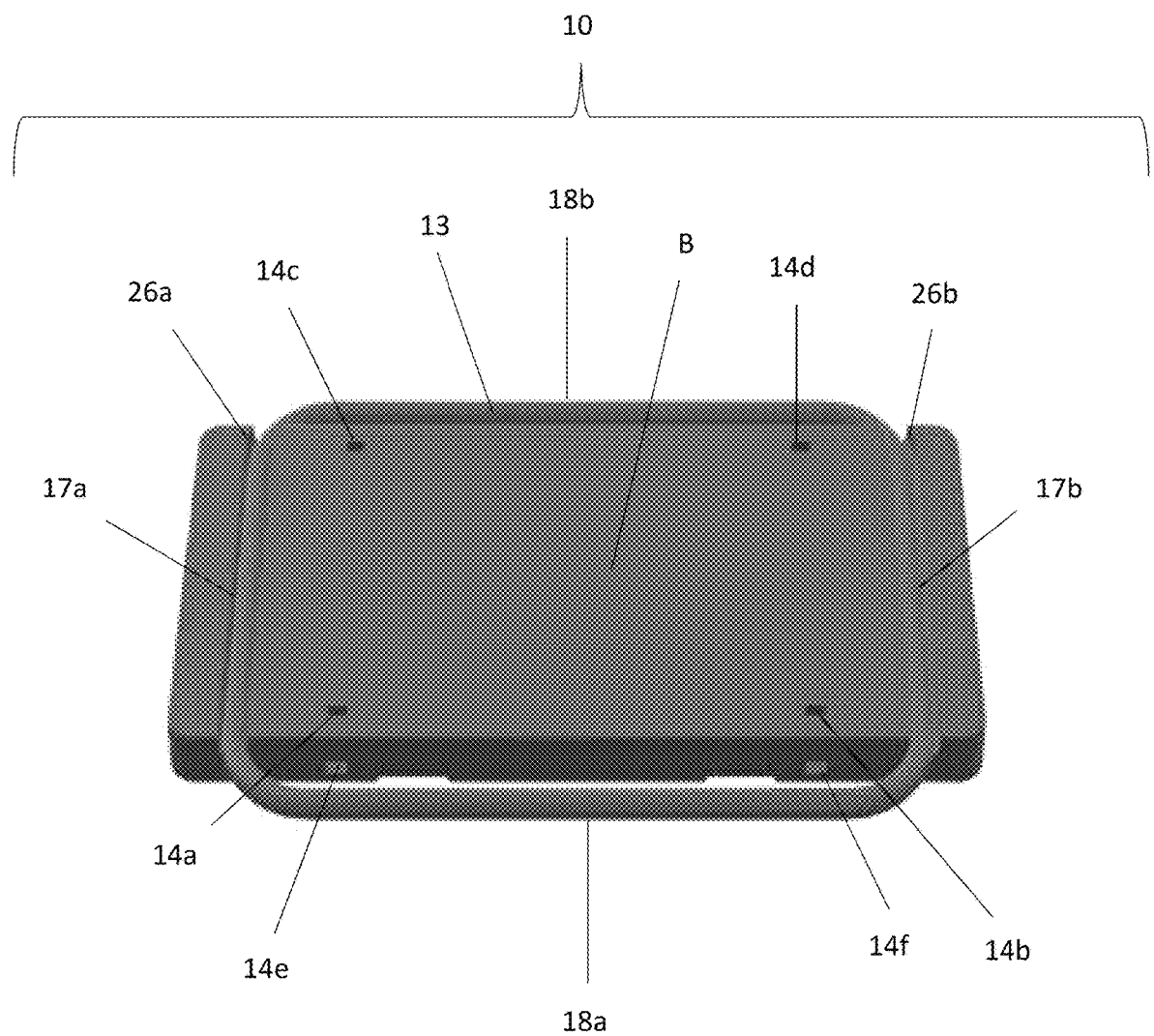
FIG. 7A shows a bottom view of the transport platform component of the attachment apparatus and/or system for securely attaching objects to a bicycle frame, in accordance with principles of the present disclosure.
Figure 7B:
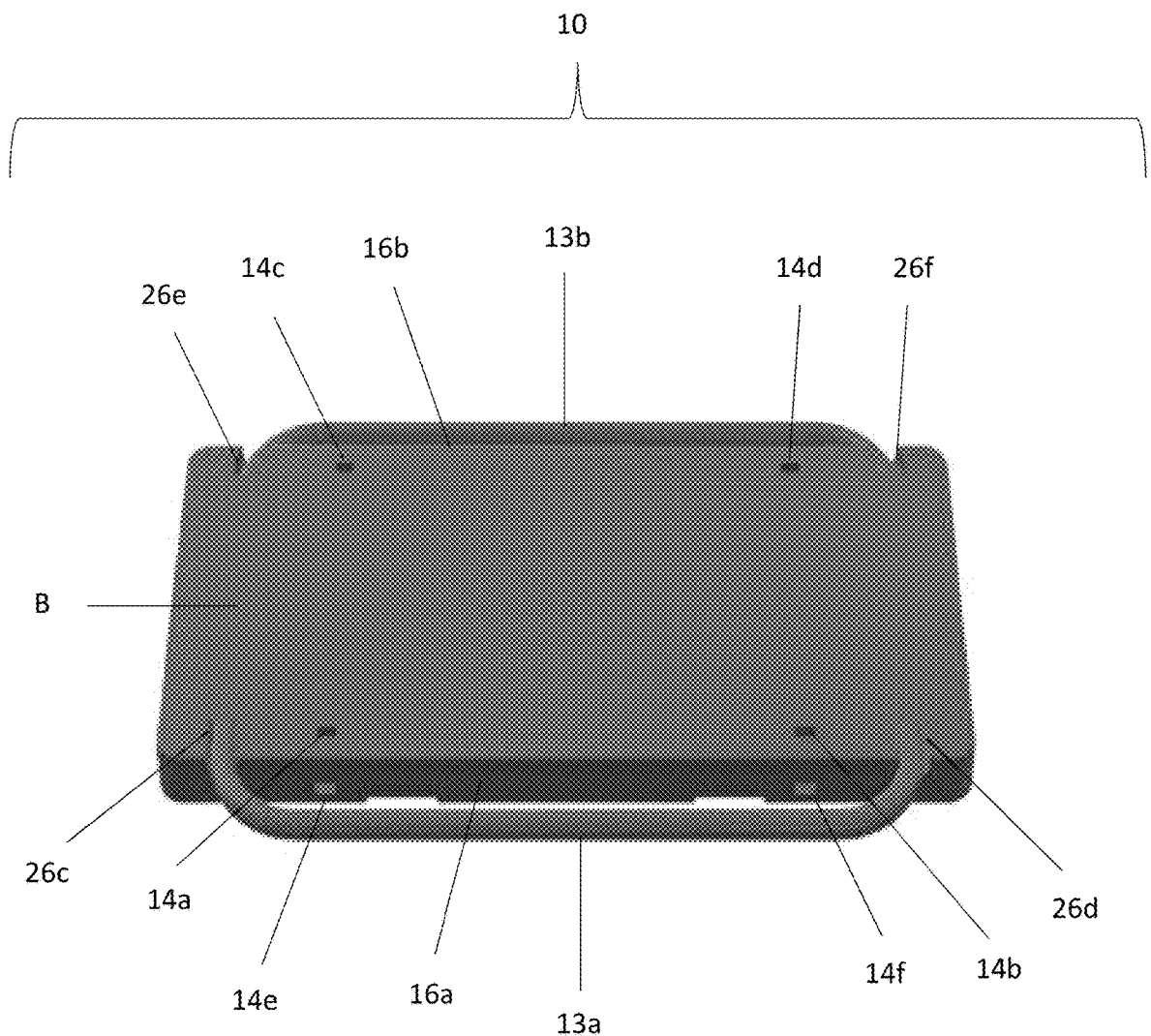
FIG. 7B shows a bottom view of another embodiment of the transport platform component of the attachment apparatus and/or system for securely attaching objects to a bicycle frame, in accordance with principles of the present disclosure.

Similarly, the rail 13 is preferably rectangular in shape with rounded edges; but may also have any other shape. The rail 13 can be manufactured from aluminum, plastic, or any other durable material with similar properties. As shown in FIG. 7A, the rail 13 is preferably a single piece that is mechanically inserted or fitted into grooves 26a, 26b at the bottom B of the base 11. This configuration holds the base 11 in place and prevents it from rattling or moving. Notwithstanding, the attachment apparatus and/or system for securely attaching objects to a bicycle frame may also be configured to have one rail 13a attached to the base 11 via grooves 26c, 26d on the first side 16a of the base 11; and another rail 13b attached to the base 11 via grooves 26e, 26f on the second side 16b of the base 11, as shown in FIG. 7B. Lastly, it must be noted that the groves 26a, 26b or 26c, 26d may, but do not have to be, symmetric with each other.

In a preferred embodiment, the rail 13 includes a first end 17a and a second end 17b that are parallel to each other and have the same length; and a first side 18a and a second side 18b that are parallel to each other and have the same length; wherein the length of the first and second sides 18a, 18b is greater than the length of the first and second ends 17a, 17b. Additionally, the first and second sides 18a, 18b of the rail 13 protrude or extend beyond the perimeter of the first and second sides 16a, 16b of the base 11, thus creating a cavity or opening 24a, 24b between the corresponding first and second sides 16a, 16b of the base 11 and the corresponding first and second sides 18a, 18b of the rail 13. It must be noted, that in some embodiments the distance between the first and second sides 16a, 16b of the base 11 and the first and second sides 18a, 18b of the rail 13 must be smaller than the width of the handle of the U-shaped lock UL. Such configuration is necessary to prevent the U-shaped lock UL from falling through the cavity or opening 24a, 24b. Notwithstanding, the cavity or opening 24a, 24b between the corresponding first and second sides 16a, 16b of the base 11 and the corresponding first and second sides 18a, 18b of the rail 13, does not have to be symmetrical in size with each other. That is, the size of the cavity or opening 24a may be bigger than the size of the cavity or opening 24b and vice versa. Lastly, the first and second sides 18a, 18b of the rail 13 may include a strap ST that provides friction to the rail 13 and thus, provides further stability by preventing the U-shaped lock UL from moving and/or rattling. The strap ST may be manufactured from rubber, leather or any other material with a high coefficient of friction.

Figure 2:
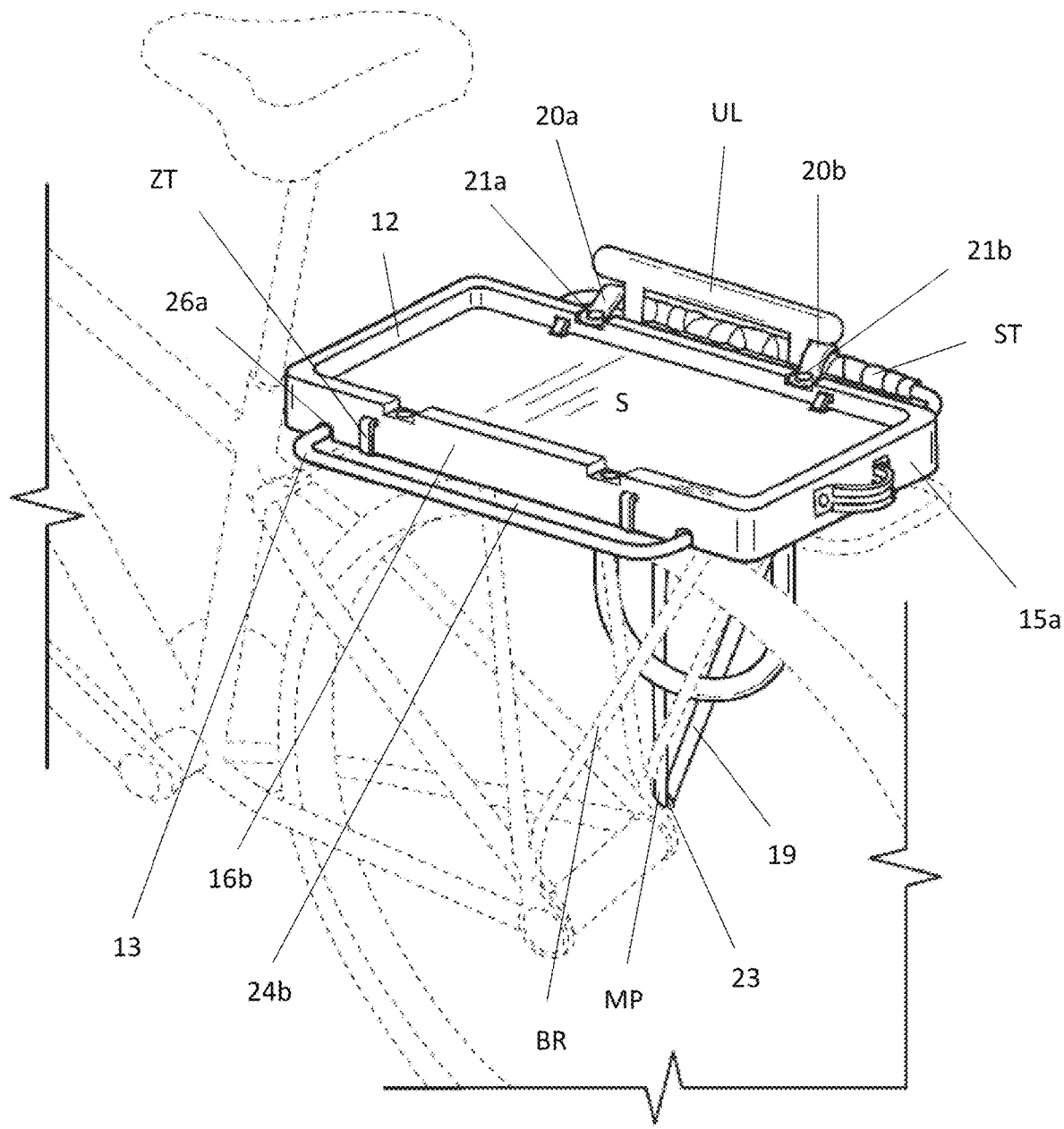
FIG. 2 shows a U-shaped lock attached to the right-side of the transport platform component of the attachment apparatus and/or system for securely attaching objects to a bicycle frame, in accordance with principles of the present disclosure.
Figure 3:
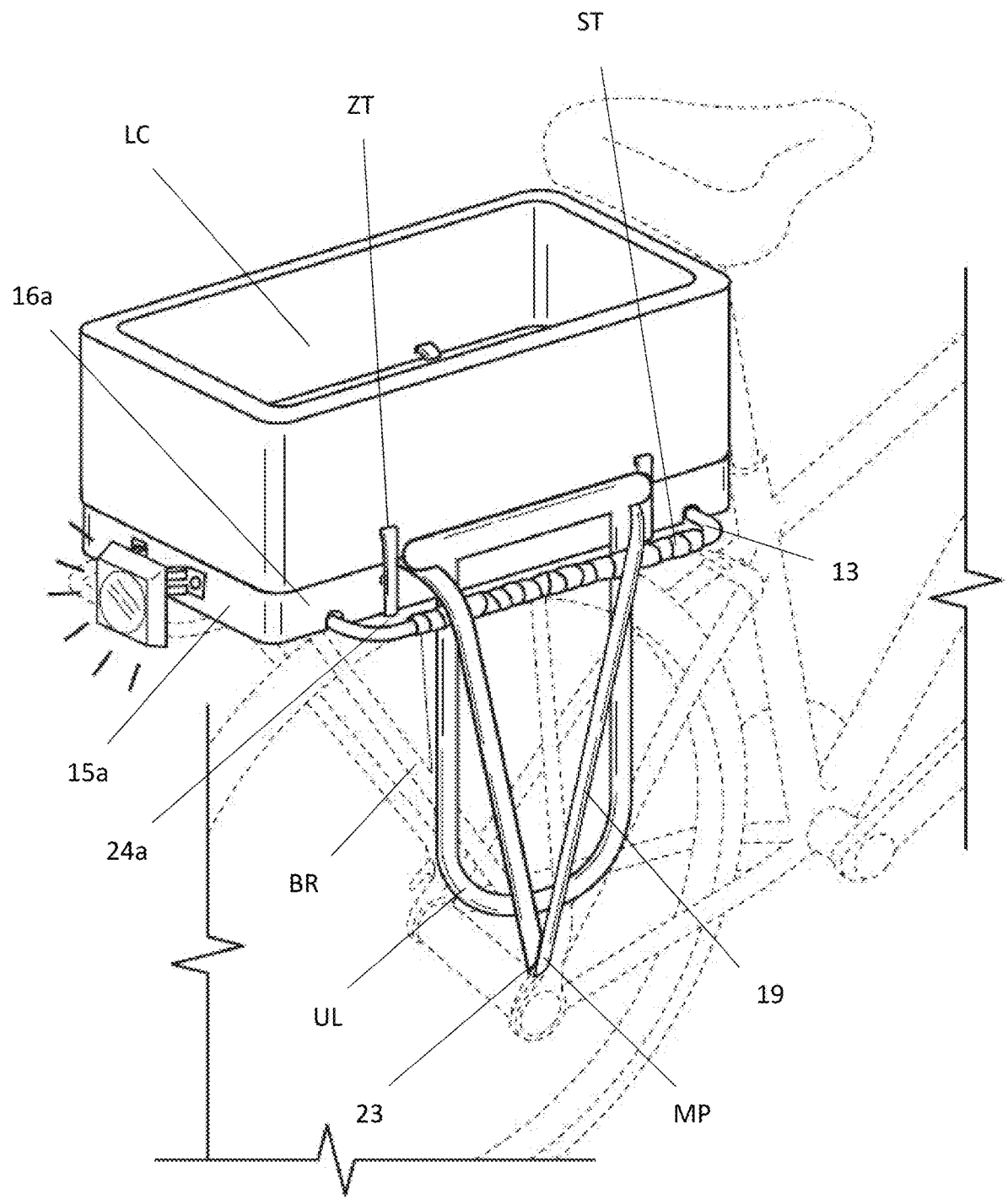
FIG. 3 shows a right-side perspective view of the attachment apparatus and/or system for securely attaching objects to a bicycle frame having an object attached to top of the transport platform component of said attachment apparatus and/or system, in accordance with principles of the present disclosure.

As shown in FIGS. 1-3, the attachment apparatus and/or system for securely attaching objects to a bicycle frame also comprises at least one connecting strap 19, having a first end 20a, and a second end 20b opposite to each other. The first end 20a of the connecting strap 19 is fastened to the base 11 via snap fastener 21a. The second end 20b is then looped over an attachment point 23 (i.e., any lower portion of the bicycle rack that may serve as support for the connecting strap) in the bicycle rack BR such that the midpoint MP of the connecting strap 19 is securely attached to the bicycle rack BR. The second end 20b is then fastened to the base 11 via snap fastener 21b. It should be noted that the first end 20a and second end 20b of the connecting strap 19 are both folded over the rail 13 (i.e., they are not inserted through the cavity 24a, 24b) while being snapped into the corresponding snap fasteners 21a, 21b. This creates a triangular shape, akin to a holster, which holds the U-shaped lock UL in place in the x, y, and z dimensions, thus preventing said lock from moving and rattling. The connecting strap 19 may be manufactured from any material that is foldable and durable, such as, but not limited to, rubber, leather, or any other material with a high co-efficient of friction. Alternatively, instead of fastening the second end 20b to the base 11 via snap fastener 21b, the second end 20b may be fastened to the base 11 via snap fastener 21d. This configuration allows the connecting strap 19 to work as a bungee cord like device to secure objects on the surface S of the base 11 of the platform for transport 10.

Accordingly, the shape of the transport platform 10, with a rail 13 that protrudes from the side of the base 11, creates a cavity or opening 24 that holds an object when the transport platform 10 is mounted on a bicycle rack BR. The connecting strap 19 will then firmly secure the U-shaped lock UL in place. To retrieve the U-shaped lock UL, the cyclist would only need to pull U-shaped lock UL out of the cavity or opening 24. It should be noted that the snap fasteners 21a, 21b, 21c, 21d are preferably mounted on the raised edges 12 of the base but may also be mounted on the first and second sides 16a, 16b of the base 11; or on the first and second ends 15a, 15b of the base; or on both.

Figure 4:
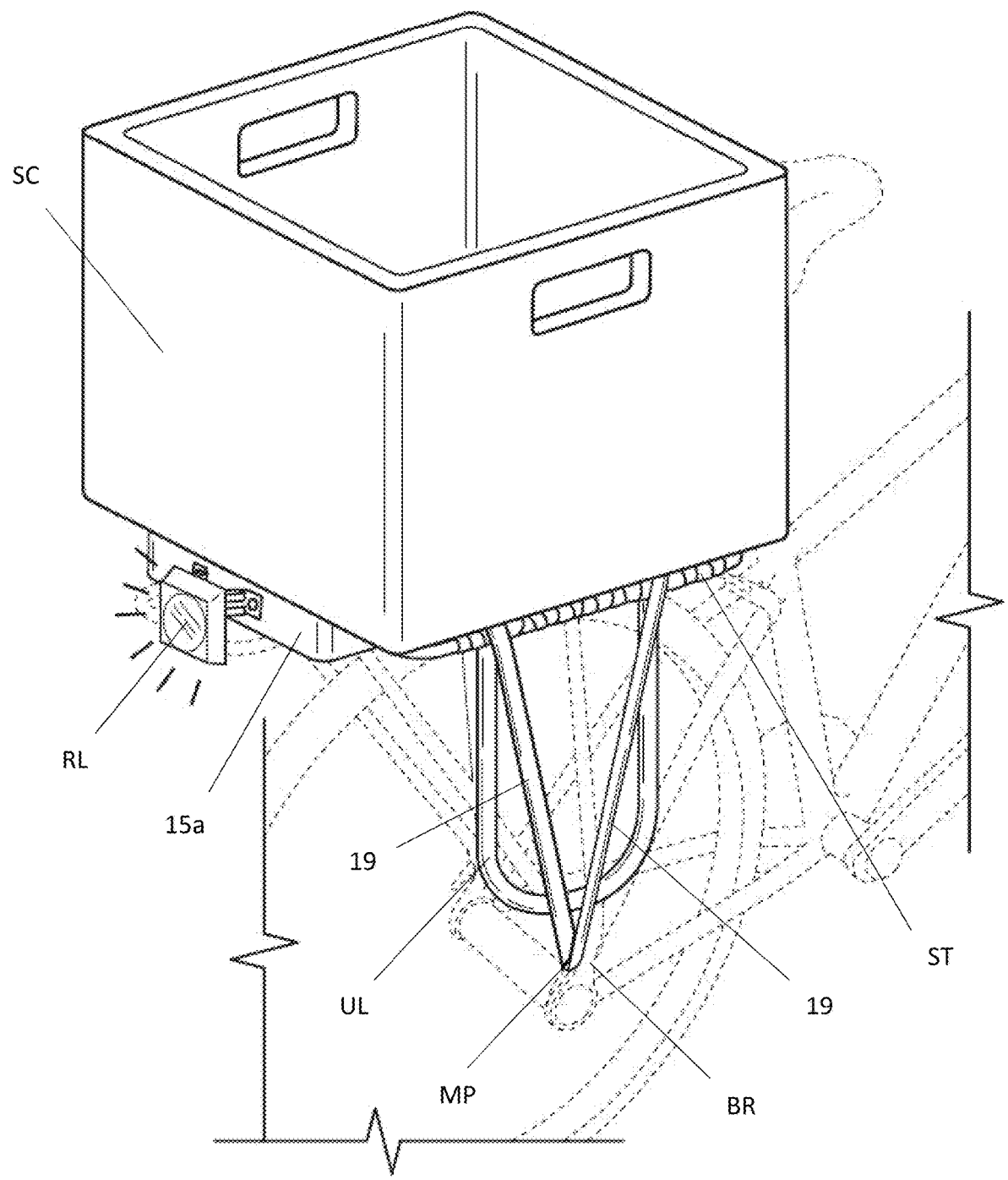
FIG. 4 shows a right-side perspective view of the attachment apparatus and/or system for securely attaching objects to a bicycle frame having a different object attached to top of the transport platform component of said attachment apparatus and/or system, in accordance with principles of the present disclosure.

As shown in FIGS. 3-4, attachments like locking containers LC or storage containers SC of various sizes, lights, solar-panel chargers, etc., can be snapped via the snap fasteners 21a, 21b, 21c, 21d onto the transport platform 10. Alternatively, the attachments can be secured to the platform 10 via one or more screws, threaded inserts or similar fastening mechanism. This modular approach supports all sorts of attachments including ones that support additional storage for hauling groceries or other items.

Figure 5:
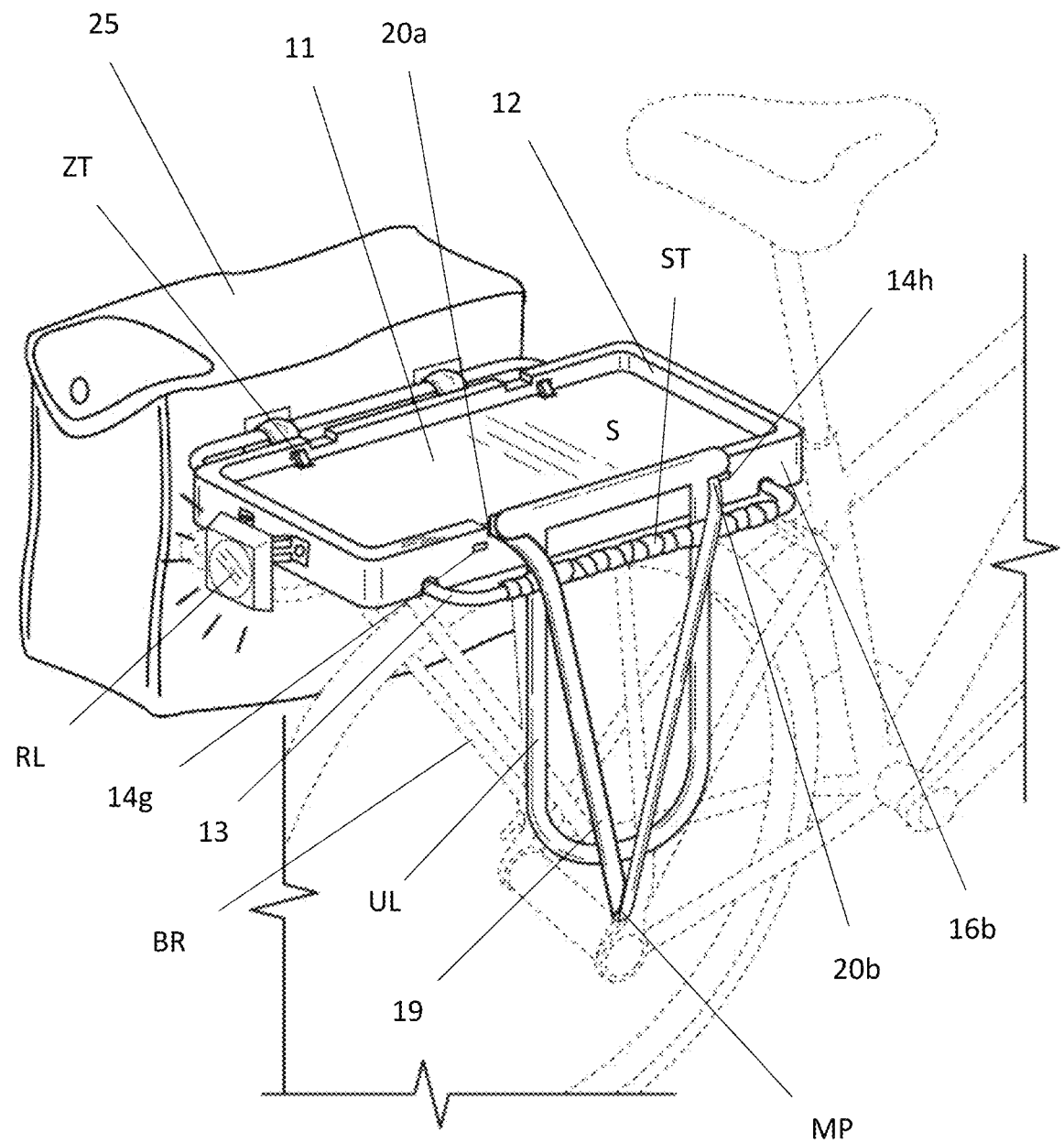
FIG. 5 shows a U-shaped lock attached to the right-side of the transport platform and supported by connecting straps as well as a pannier bag attached to the left-side of the transport platform, in accordance with principles of the present disclosure.
Figure 6:
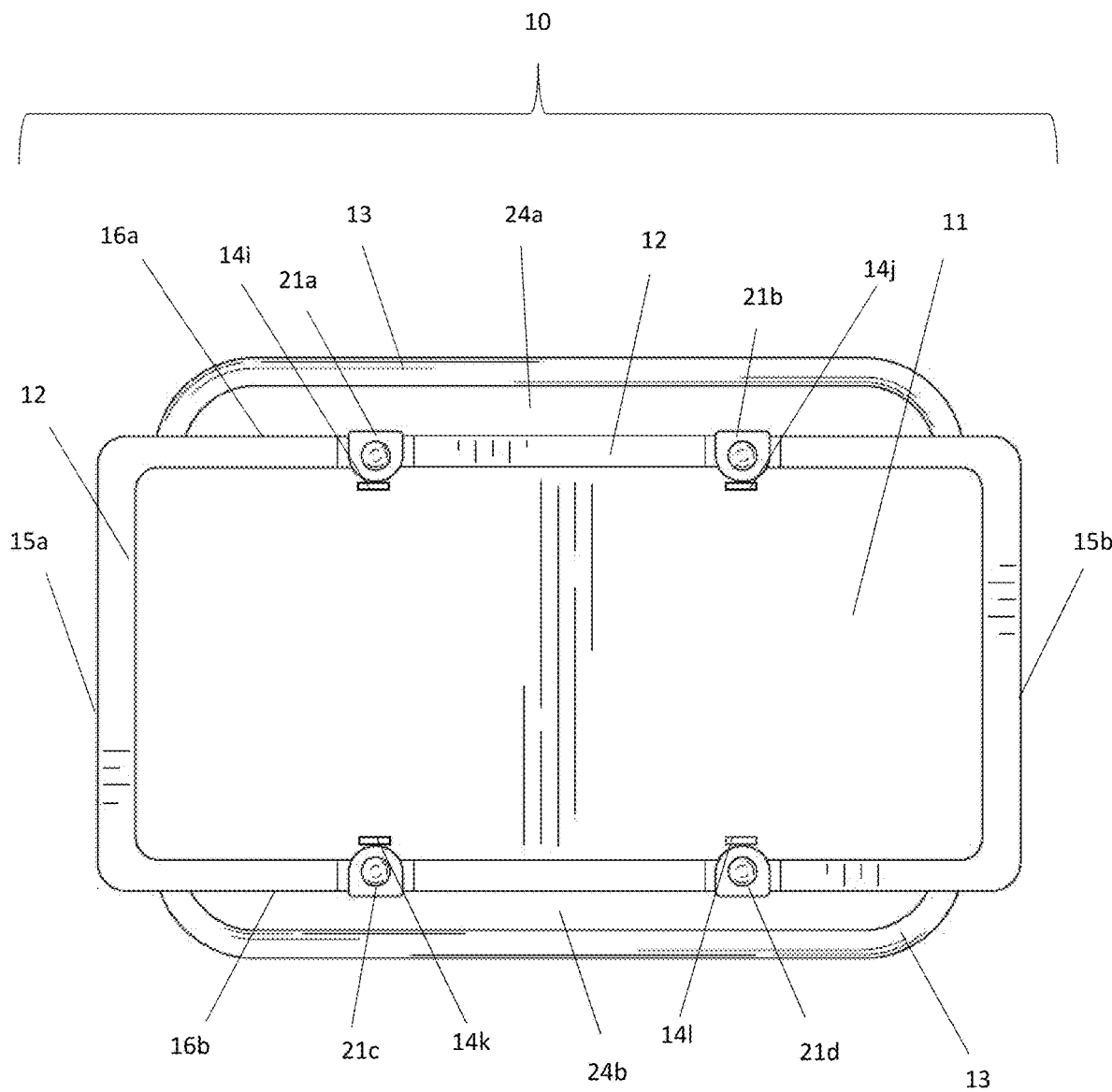
FIG. 6 shows a top view of the transport platform component of the attachment apparatus and/or system for securely attaching objects to a bicycle frame, in accordance with principles of the present disclosure.

As shown in FIG. 5, the transport platform 10 also enables the rider to mount saddlebags or panniers 25. The side rails on the transport platform 10 permit the use of saddle bags or panniers 25 on one or both sides of the base 11, unlike other systems that support storage on top of the rack and prevent the use of saddlebags. Moreover, the existing functionality of the bicycle rack BR is not compromised with the attachment apparatus and/or system for securely attaching objects to a bicycle frame. For example, a light bracket 27 may be mounted on the first end 15a of the base 11 so that riders can also attach a rear light RL for visibility.

As shown in FIGS. 1, 2, 5, and 6, and as previously discussed, the base 11 also comprises a raised edge 12 around the entire perimeter of said base 11. This raised edge 12 ensures that objects placed on the top of the base 11 do not slide off the transport platform 10. In effect, it provides a passive way to secure objects on the transport platform 10. Coupled with a bungee cord, the object would be securely held in place.

Figure 8:
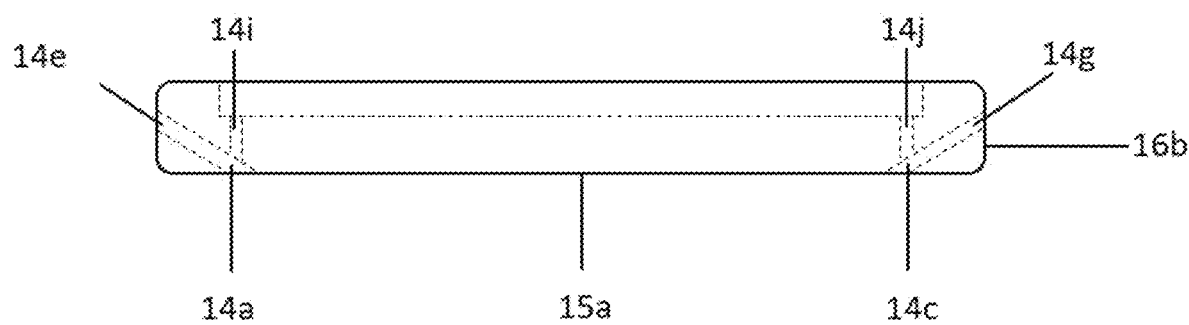
FIG. 8 shows an orthogonal view of the transport platform component of the attachment apparatus and/or system for securely attaching objects to a bicycle frame, in accordance with principles of the present disclosure.

FIG. 8 shows an orthogonal view of the base 11 of the transport platform 10 depicting the one or more holes used for drainage or for mounting the base 11 to the bicycle rack BR. In one embodiment of the transport platform 10, the cable ties or zip ties ZT may be inserted through one or more diagonal holes 14e, 14f, 14g, 14h on the first and second sides 16a, 16b of the base 11 that connect with corresponding holes 14a, 14b, 14c, 14d respectively, on the bottom surface of the base 11, as shown in FIG. 8. It should be noted that the one or more diagonal holes 14e, 14f, 14g, 14h on the first and second sides 16a, 16b of the base 11 preferably have a 45° angle. When the cable ties or zip ties ZT are inserted through the one or more diagonal holes in the aforementioned configuration they do not take up any of the space on the top surface of the base 11.

Figure 9:
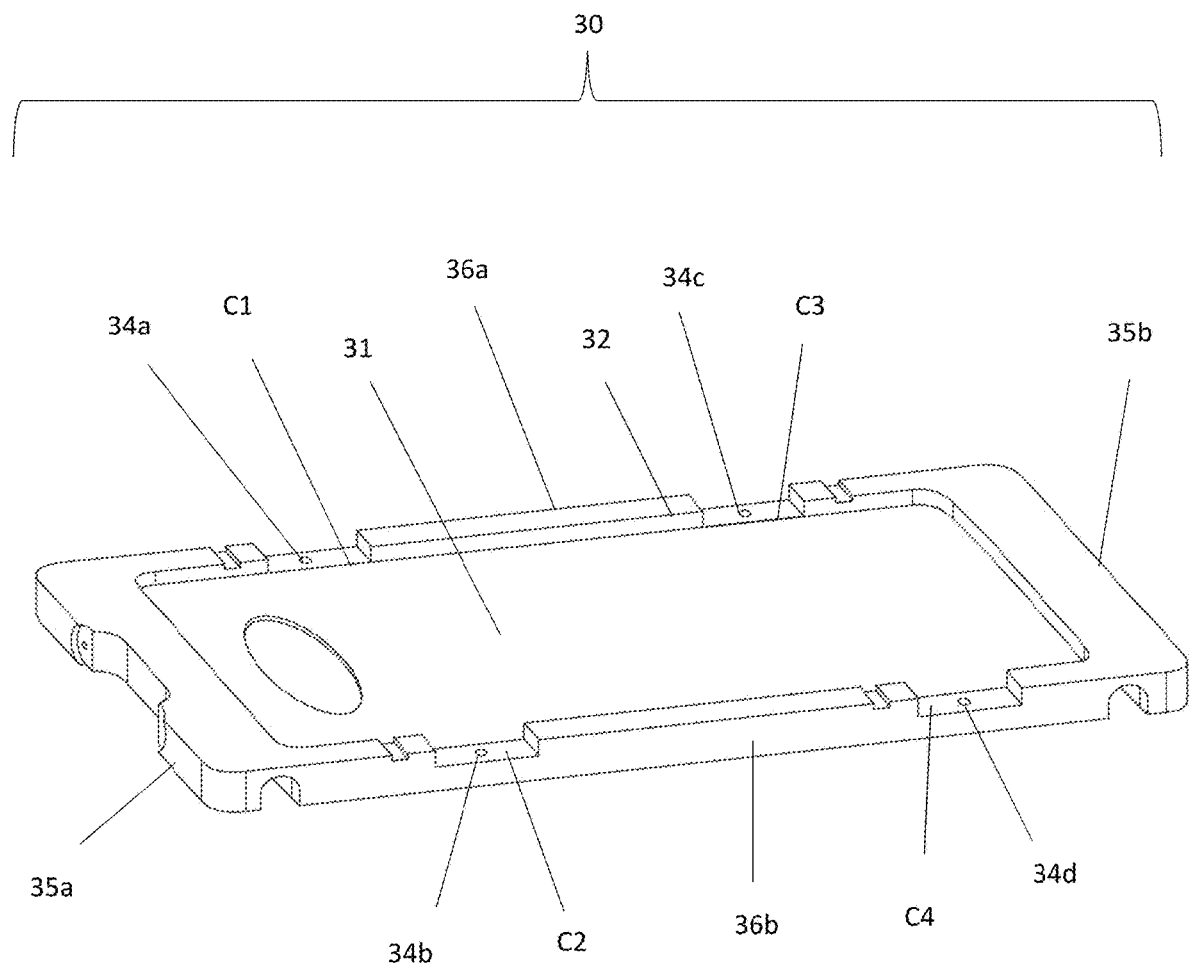
FIG. 9 shows a perspective view of a second embodiment of the transport platform, in accordance with principles of the present disclosure.
Figure 10:
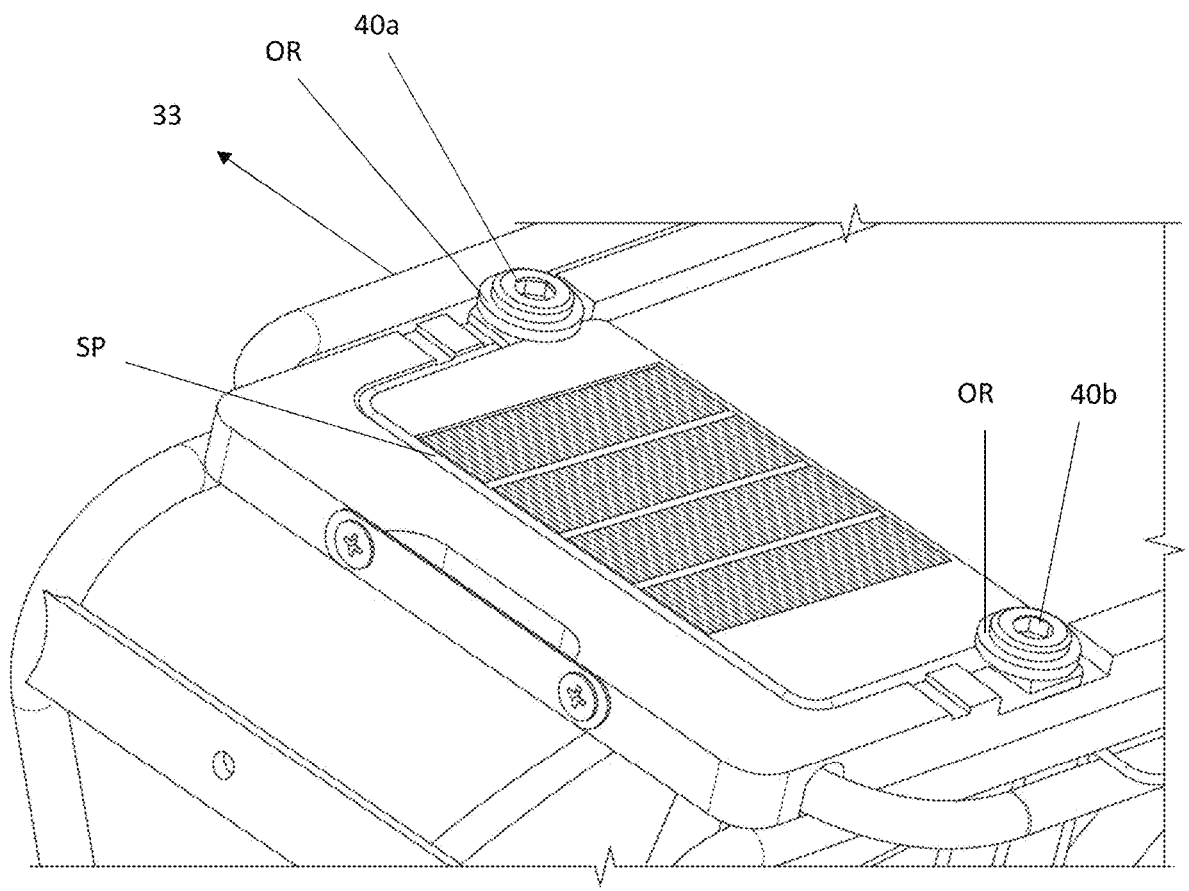
FIG. 10 shows a perspective view of the solar panel component of the second embodiment of the transport platform, in accordance with principles of the present disclosure.

FIGS. 9-16 refer to an alternate embodiment of the attachment apparatus and/or system for securely attaching objects to a bicycle frame comprising a transport platform 30 that is configured to be attached to the top of the bicycle rack BR. The transport platform 30, in turn, comprises a base 31 with raised edges 32; and a rail 33 that extends from two sides of the base 31. In this embodiment, however, the raised edges 32 include one or more cutouts C1, C2, C3, C4 at different locations along the edge of the base 31, as shown in FIG. 9. Accordingly, the base 31 does not have any raised edges in the areas where the cutouts C1, C2, C3, C4 are located, thereby giving the platform 30 the appearance of a platform with intermittent raised edges. The purpose of these cutouts is to support different types of attachments. This modular design of the platform 30 ensures that the attachments can be independently created, modified, replaced, or exchanged with other attachments. Ultimately, this design ensures bicycle riders can transport a variety of objects.

Moreover, the base 31 includes a first end 35a and a second end 35b that are parallel to each other and have the same length; and a first side 36a and a second side 36b that are parallel to each other and have the same length, wherein the length of the first and second sides 36a, 36b is greater than the length of the first and second ends 35a, 35b. The base 31 further comprises one or more holes 34a-34d that cross through the surface S2 or sides 36a, 36b of the base 31 that may be used to 1) either secure the transport platform 30 to the bicycle rack BR via one or more screws 40a, 40b or zip ties; or 2) to serve as drainage for the base 31. The one or more holes 34a-34d are individually located in each of the cutouts C1, C2, C3, C4 of the base 31. As such, hole 34a is located in cutout C1; hole 34b is located in cutout C2; hole 34c is located in cutout C3; and hole 34d is located in cutout C4. The one or more holes 34a-34d include a threaded insert for receiving the one or more screws 40a, 40b.

As with previous embodiments, the rail 33 is preferably a single piece that is mechanically inserted or fitted into grooves at the bottom of the base 31 in the manner described for the embodiment shown in FIG. 7A. Notwithstanding the foregoing, the rail 33 can also be comprised of separate pieces as described for the embodiment shown in FIG. 7B. Moreover, the rail 33 includes a first end 37a and a second end 37b that are parallel to each other and have the same length; and a first side 33a and a second side 33b that are parallel to each other and have the same length; wherein the length of the first and second sides 33a, 33b is greater than the length of the first and second ends 37a, 37b. Additionally, the first and second sides 33a, 33b of the rail 33 protrude or extend beyond the perimeter of the first and second sides 36a, 36b of the base 31, thereby creating a cavity or opening 44a, 44b between the corresponding first and second sides 36a, 36b of the base 31 and the corresponding first and second sides 33a, 33b of the rail 33.

In addition to the attachments already disclosed (e.g., locking containers LC and storage containers SC), the transport platform 30 may have additional attachments such as a solar charging panel SP; and different embodiments of a caddy attachment CA1, CA2, as shown in FIGS. 10-16. Particularly, the solar panel SP comprises one or more photovoltaic panels PP to collect solar energy and a battery SB to store solar energy. The solar panel SP is configured to fit within the raised edges 32 of the base 31; and may include one or more holes SO1, SO2 located on the side of the panel and having threaded inserts configured to receive the one or more screws 40a, 40b or similar fastening mechanisms. The one or more holes SO1, SO2 on the solar panel SP correspond with two of the holes 34a, 34b on the cutout portion C1, C2 on the edge of the base 31. As such, when the screws are inserted through the one more holes SO1, SO2 and the corresponding holes 34a, 34b on the edge of the base 31, the solar panel is tightly secured to the base 31. O-rings OR may also be used when securing the solar panel SP to the base 31 via the one or more screws 40a, 40b.

The caddy attachments CA1, CA2, on the other hand, are structures configured to hold the U-shaped lock UL in place in the x, y, and z dimensions. Particularly, the first embodiment of the caddy attachment CA1 comprises a U-shaped bottom portion USP that includes a first bar 41a having a first end E1 and a second end E2; and a second bar 41b also having a first end E3 and a second end E4. The first and second bars 41a, 41b are parallel to each other. The caddy attachment CA1 further comprises a rim R that is preferably rectangular and has rounded edges but may have any other shape. The rim R includes a top end R1 and a bottom end R2, wherein said top and bottom ends R1, R2 are parallel to each other and have the same length. The rim R further includes a first side R3 and second side R4, wherein said first and second sides R3, R4 are parallel to each other and have the same length. Moreover, the first and second sides R3, R4 have end portions that are welded or connected to end portions of the top and bottom ends R1, R2; and that the length of the top and bottom ends R1, R2 is greater than the length of the first and second sides R3, R4. It should also be noted that the bottom U-shaped portion USP is perpendicularly connected or welded to the rim R. Specifically, the first and second ends E1, E2 of the first bar 41a may be perpendicularly welded or connected to the top end R1; or alternatively to the first and second sides R3, R4 of the rim R (i.e., first end E1 welded to second side R4 and second side E2 welded to first side R3). Similarly, the first and second ends E3, E4 of the second bar 41b may be perpendicularly welded or connected to the bottom end R2; or alternatively to the first and second sides R3, R4 of the rim R (i.e., first end E3 welded to second side R4 and second side E4 welded to first side R3). This configuration creates a structure having an opening OC that serves as the means of entry into the caddy attachment CA1.

Figure 11:
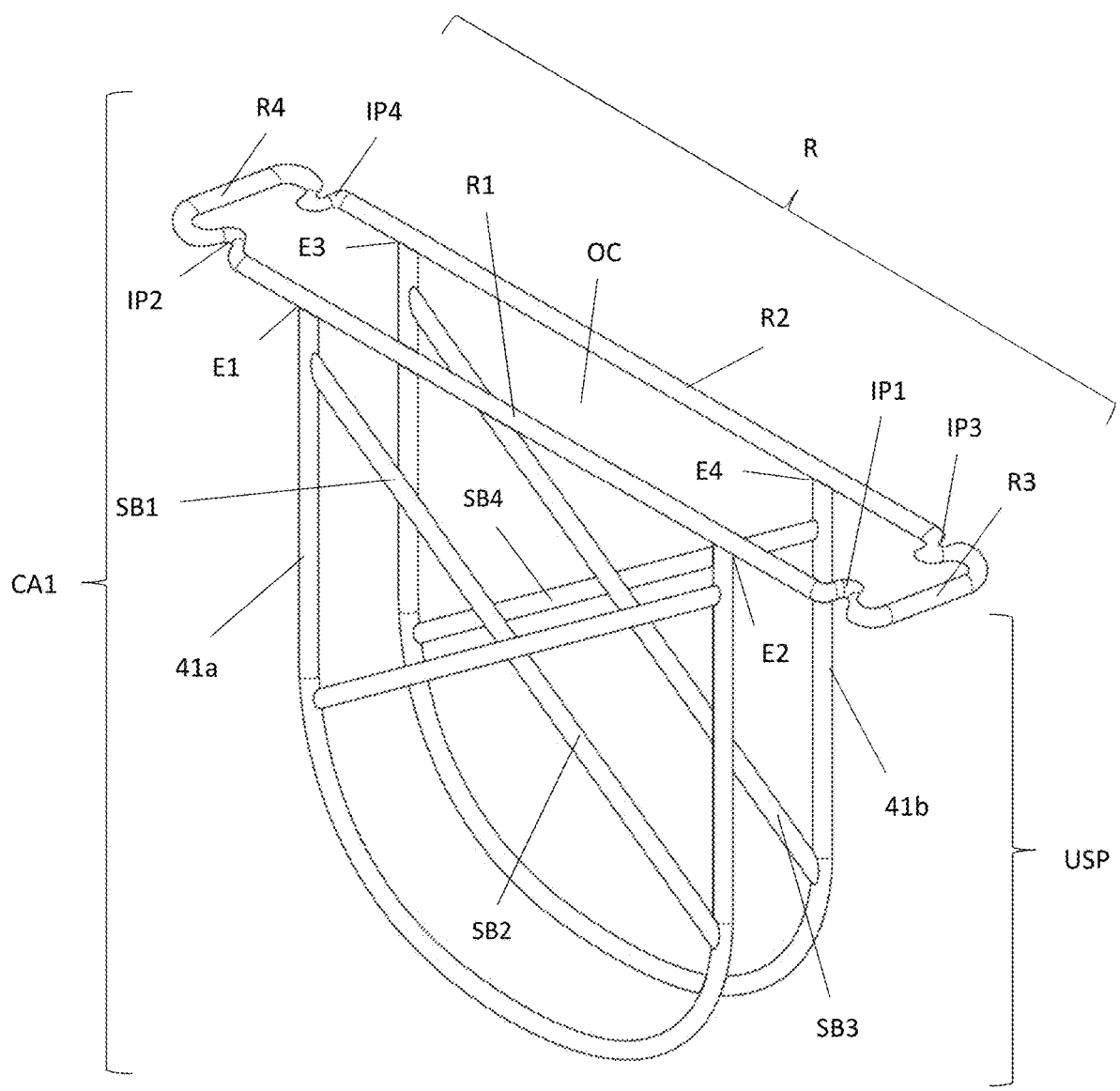
FIG. 11 shows a first embodiment of a caddy attachment to be used with the second embodiment of the transport platform, in accordance with principles of the present disclosure.
Figure 12:
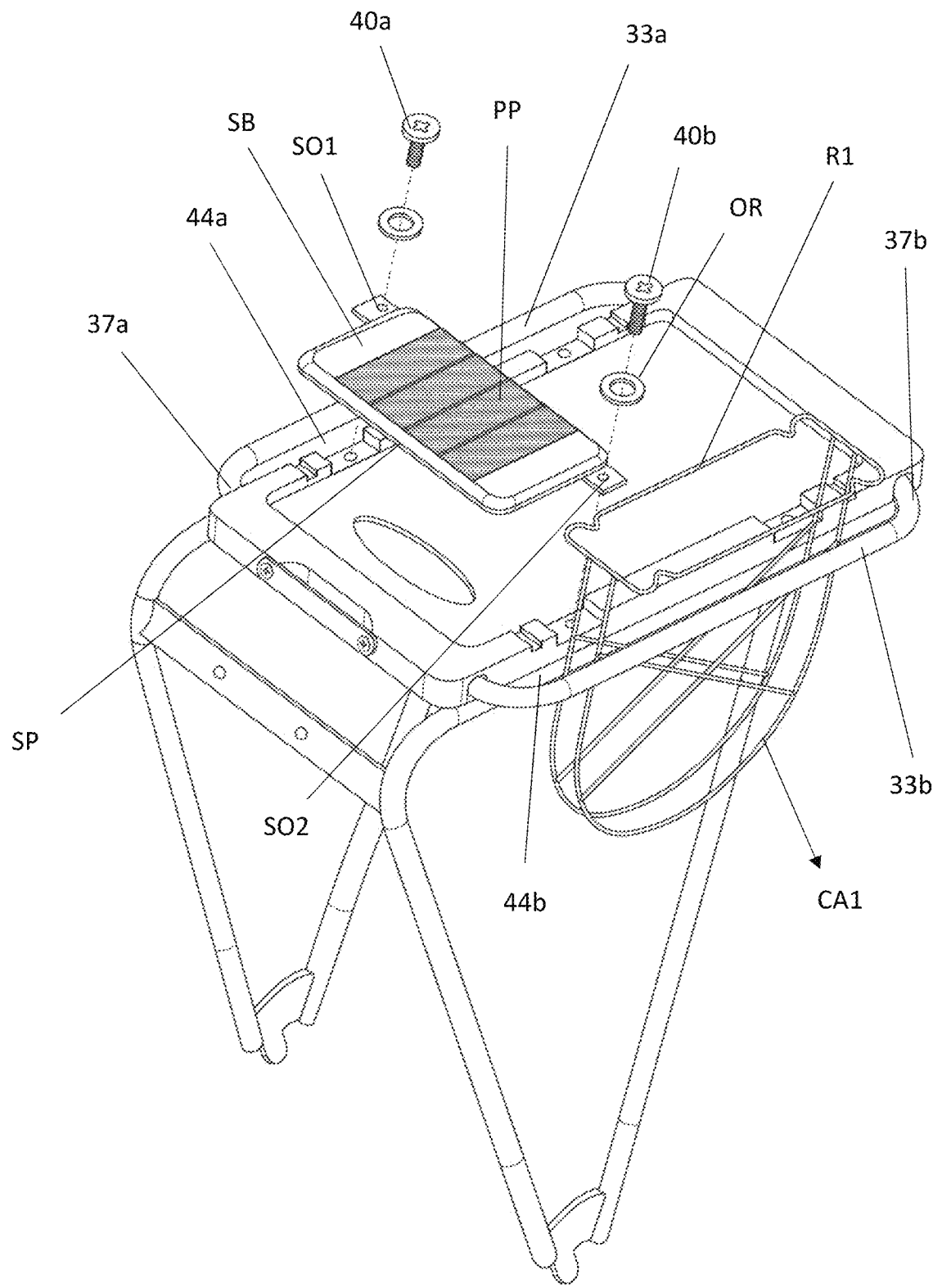
FIG. 12 shows a perspective view of all components of the second embodiment of the transport platform, in accordance with principles of the present disclosure.

Additionally, the caddy attachment CA1 includes one or more support bars SB1, SB2 connecting opposing portions of the first bar 41a; and one or more support bars SB3, SB4 connecting opposing portions of the second bar 41b. The support bars provide support and stability to the caddy attachment CA1 and help in stabilizing the U-shaped lock UL when inserted via the opening OC of the caddy attachment CA1. The caddy attachment CA1 is therefore akin to a holster that holds the U-shaped lock UL in place in the x, y and z dimensions and prevents said lock from moving and rattling. The support bars SB1, SB2, SB3, SB4 should preferably be diagonally connected or welded to the opposing portions of the corresponding bar 41a, 41b; but may also be connected in any other manner that provides stability to the caddy attachment CA1. Moreover, it is preferable that the support bars SB1, SB2, SB3, SB4 that are diagonally connected to the opposing portions of the corresponding bar 41a, 41b do not be parallel to each other. In other words, support bars SB1, SB2 in bar 41a and support bars SB3, SB4 in bar 41b should have the appearance of the letter "X", as shown in FIG. 11.

Figure 13:
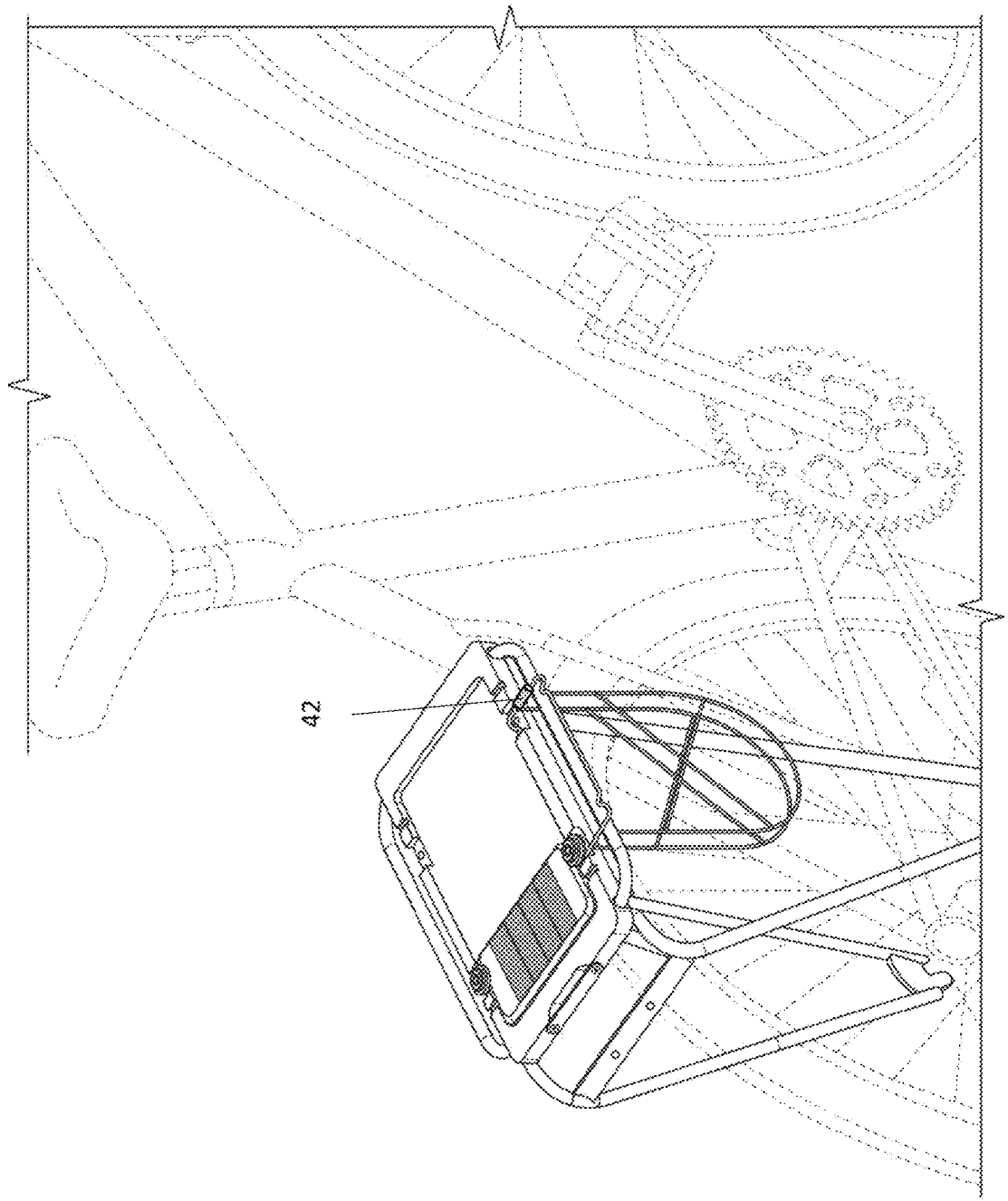
FIG. 13 shows the first embodiment of the caddy attachment installed on the second embodiment of the transport platform, in accordance with principles of the present disclosure.

The caddy attachment CA1 is configured to be inserted in the opening 44a or 44b between the base 31 and the rail 33. When inserted through the opening 44a, 44b, the top end R1 of the rim R will rest on the edge of the base 31; and the bottom end R2 will rest on the rail 33. In other words, a first portion of the rim R of the caddy attachment will be resting on (or secured to) the cutout portions C1, C3 or C2, C4 of the base 31 and a second portion of the rim R will be resting on the rail 33. The rim R has one or more indented portions IP1, IP2, IP3, IP4 that are configured to fit in the cutouts C1, C3 or C2, C4 of the base 31. The indented portions IP1, IP2, IP3, IP4 prevent the holes 34b, 34d or 34a, 34c from being covered when the caddy attachment CA1 is resting on the base 31 and rail 33, thereby providing access to the one or more screws required to secure the caddy attachment CA1 to the platform 30. The shape of the indented portions IP1, IP2, IP3, IP4 permits corresponding screws to access the holes 34a-34d in the base 31 and allows a portion of the screws to secure the rim R to the base 31. O-rings OR can be used to facilitate tightening of the rim R to the base 31. It should also be noted that the top end R1 and bottom end R2 of the rim R should preferably have a length that is similar to one of the raised edges 32 of the base 31 that are adjacent to the holes 34b, 34d or 34a, 34c on the cutout portions C1, C3 or C2, C4. This length, in combination with the indented portions IP1, IP2, IP3, IP4 will allow the indented portions IP1, IP2, IP3, IP4 to be fitted on the corresponding raised edge 32, as shown in FIG. 13.

Figure 14:
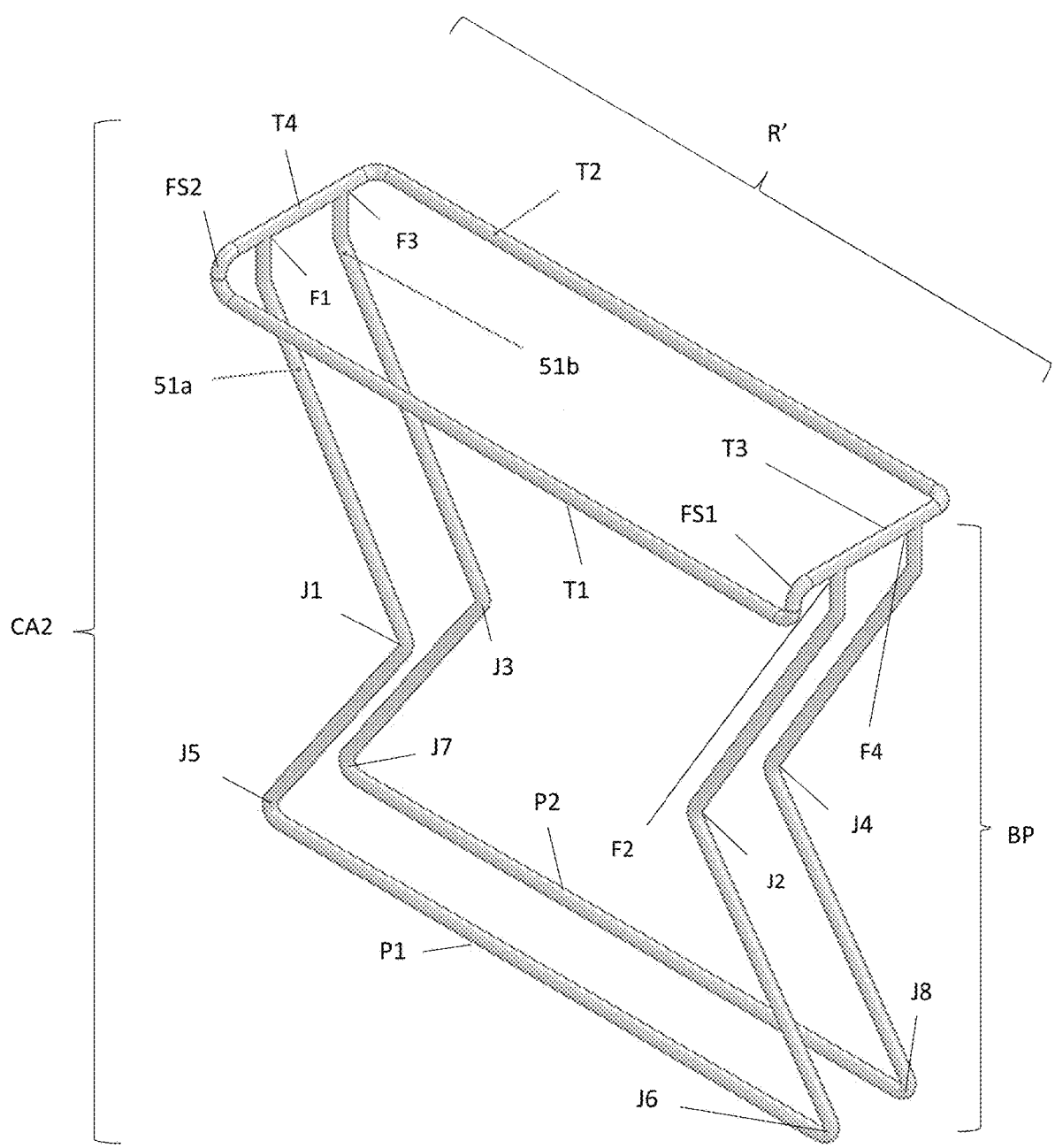
FIG. 14 shows a second embodiment of the caddy attachment, in accordance with principles of the present disclosure.
Figure 15:
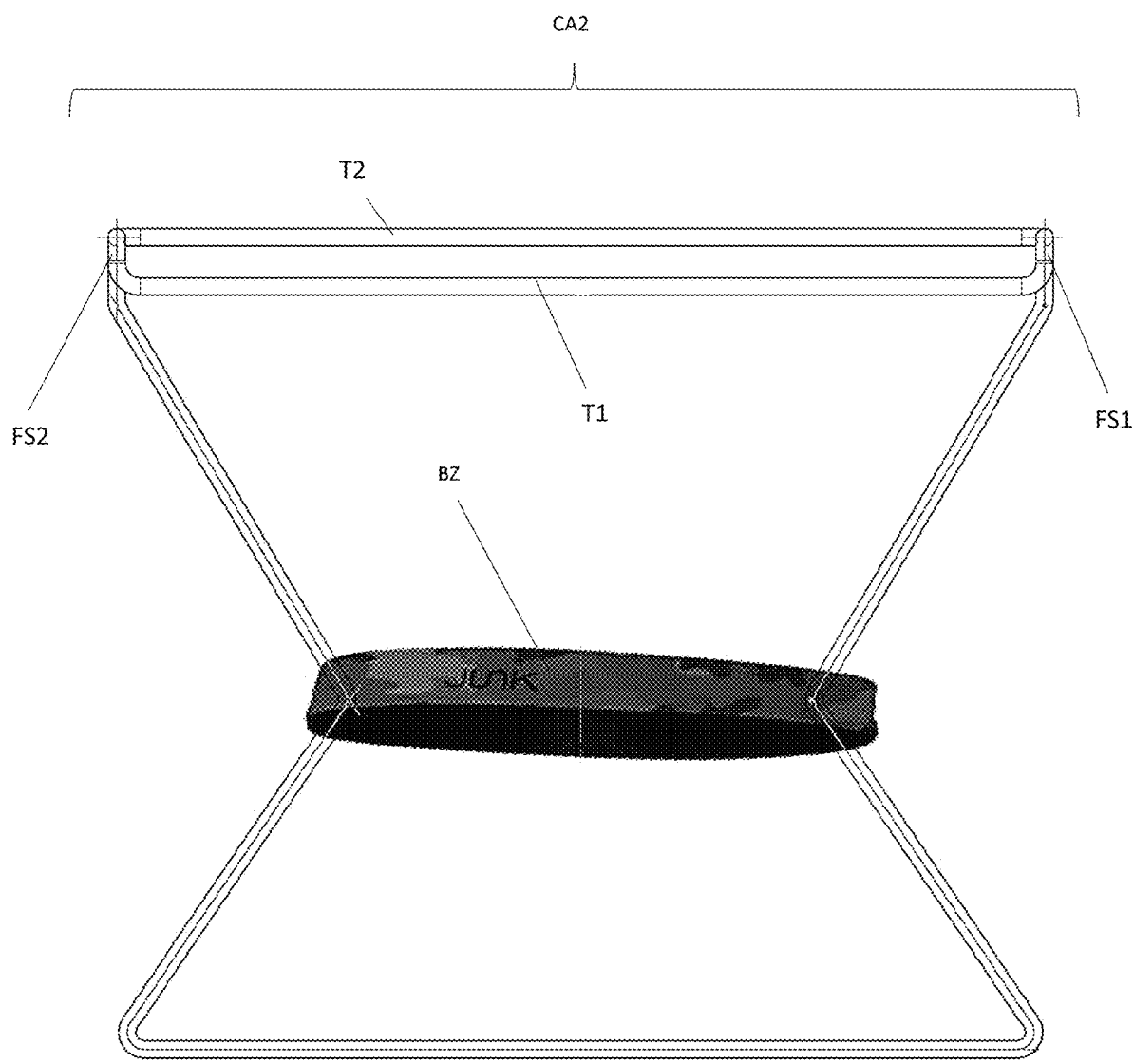
FIG. 15 shows a front view of the second embodiment of the caddy attachment with an elastic band, in accordance with principles of the present disclosure.
Figure 16:
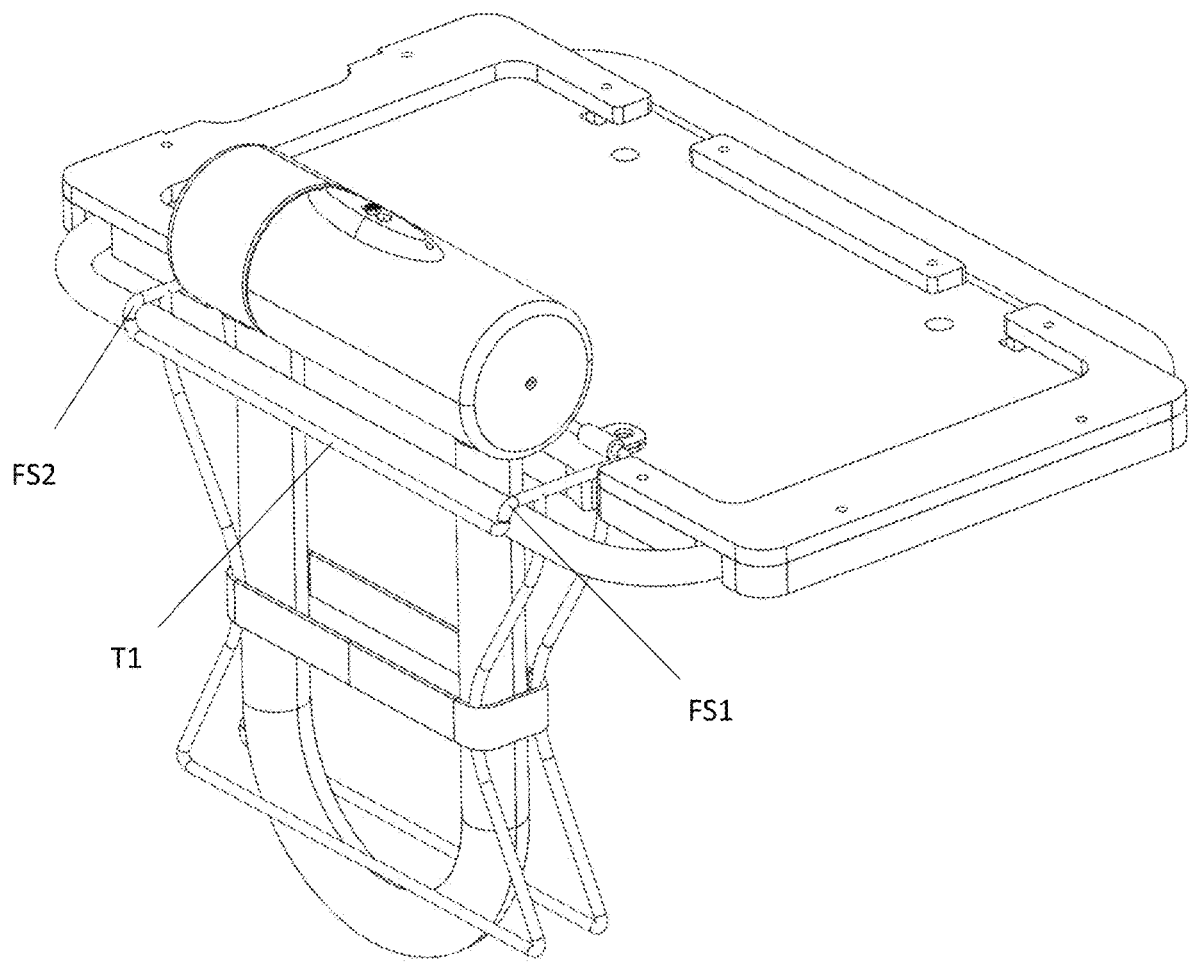
FIG. 16 shows the second embodiment of the caddy attachment installed on the second embodiment of the transport platform, in accordance with principles of the present disclosure.

FIGS. 14-16 show the second embodiment of the caddy attachment CA2. In this embodiment, the caddy attachment comprises a bottom portion BP that includes a first bar 51a having a first end F1 and a second end F2; and a second bar 51b also having a first end F3 and a second end F4. The first and second bars 51a, 51b are parallel to each other. The caddy attachment CA2 further comprises a rim R' that is preferably rectangular and has rounded edges but may have any other shape. The rim R' includes a top end T1 and a bottom end T2, wherein said top and bottom ends T1, T2 are parallel to each other and have the same length. The top end T1 may include one or more folded sections FS1, FS2 that permit the rim R' to fit over the rail 33 of the transport platform 30, as shown in FIG. 16 (i.e., the rail 33 fits in the space between the folded section of the rim R' and the first bar 51a). The bottom end T2, on the other hand, fits over one of the raised edges 32 of the transport platform 30 and is secured thereto via one or more screws inserted through the one or more holes 34a-34d, as also shown in FIG. 16.

The first and second bars 51a, 51b in the bottom portion BP preferably include one or more junctures J1-J8 that give the bottom portion of the caddy attachment CA2 a zigzag shape, as shown in FIG. 14. Nonetheless, the bottom portion BP may have any other shape. As a result of the zigzag shape, the first and second bars 51a, 51b, (taking as a starting point the first and second ends F1, F2, F3, F4) initially tilt downwardly and away from the perimeter of the rim R' and towards the middle or center of the rim R' until reaching a first set of junctures J1-J4. Once at the first set of junctures J1-J4, the first and second bars 51a, 51b then tilt downwardly and away from the center of the rim R' until reaching a second set of junctures J5-J8. Once there, the first and second bars 51a, 51b move horizontally towards the center of the rim R' and form the base portion P1, P2 of the caddy attachment CA2. The zigzag shape provides a structure akin to a holster for holding the U-shaped lock UL in place in the x, y and z dimensions, thus preventing said lock from moving and rattling.

The rim R' further includes a first side T3 and second side T4, wherein said first and second sides T3, T4 are parallel to each other and have the same length. Moreover, the first and second sides T3, T4 have end portions that are welded or connected to end portions of the top and bottom ends T1, T2; and that the length of the top and bottom ends T1, T2 is greater than the length of the first and second sides T3, T4. It should also be noted that the bottom portion BP is perpendicularly connected or welded to the rim R'. Specifically, the first and second ends F1, F2 of the first bar 51a are perpendicularly welded or connected to the first and second sides T3, T4 of the rim R', but may, alternatively, be welded or connected to top end T1. Similarly, the first and second ends F3, F4 of the second bar 41b are perpendicularly welded or connected to the first and second sides R3, R4 of the rim R', but may, alternatively, be connected to the bottom end T2. This configuration creates a structure having an opening OC' that serves as the means of entry into the caddy attachment CA2.

The caddy attachments CA1, CA2 can be manufactured from metal wire bent into the shape of a U-lock. The caddy attachments CA1, CA2 may comprise one or more bands 42 of rubber, silicone or similar material having a high coefficient of friction to tether/restrict the U-lock UL or particular item from movement during transport, as shown in FIG. 13. The caddy attachments CA1, CA2 in conjunction with the one or more bands 42 with high friction fit a wide range of different sized U-shaped locks while minimizing movement and sound. In one embodiment, only the rim R, R' (or a portion thereof) of the caddy attachment includes the bands 42, while in other embodiment, both the rim R, R' and U-shaped bottom portion USP or bottom portion BP include the bands 42. Alternatively, only the U-shaped bottom portion USP or bottom portion BP may include the bands 42. Lastly, it should be noted that the caddy attachment CA2 may comprise one or more elastic bands BZ to fit and secure different sized U-shaped locks UL, as shown in FIG. 15. The elastic bands BZ can be manufactured from any elastic material.

FIGS. 17-21 relate to a container adapter plate 50 that can be used as an add-on to the transport platform 30 of the attachment apparatus and/or system for securely attaching objects to a bicycle frame disclosed above. The adapter plate 50 provides variability on the placement of a box or container 60 in the x and y directions; and includes a quick release fastening to control motion in the z direction, thereby facilitating the removal of the container from the attachment apparatus and/or system for securely attaching objects to a bicycle. A key innovation of the adapter plate 50 is that it comprises two layers, each to achieve a different purpose, as further described below. As a result, the adapter plate 50 provides adjustability to accommodate different rider sizes and container needs.

Figure 17:
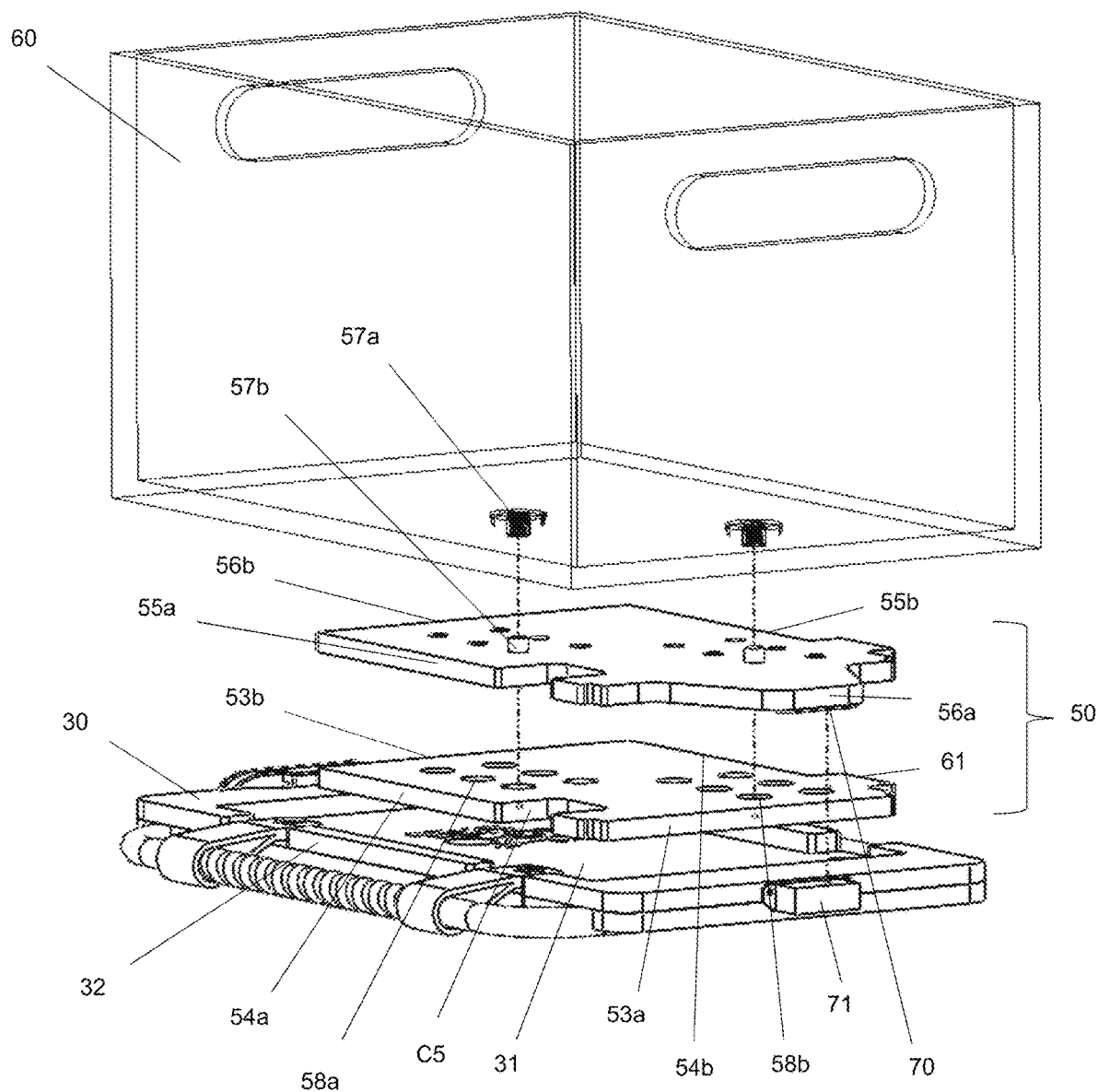
FIG. 17 shows an exploded view of a container adapter plate for use with an attachment apparatus and/or system for securely attaching objects to a bicycle frame, in accordance with principles of the present disclosure.

Particularly, the adapter plate 50 comprises a lower layer 51 and an upper layer 52 that are fastened, glued, or adhered to each other. The lower layer 51 includes a first end 53a and a second end 53b that are opposite to each other; and a first side 54a and a second side 54b that are opposite to each other. The lower layer 51 also includes one or more openings 58a, 58b, each of which are adapted to receive a T-nut 57a (or similar fastening means) which, in turn, is adapted to interact with a screw or fastener 57b. The one or more openings 58a, 58b should preferably be wide enough to allow the head of the screw 57b to be hidden inside of the lower layer 51. In this manner, the lower layer 51 remains flush with the base 31 of the platform 30. As shown in FIG. 17, the one or more openings 58a, 58b in the lower layer 51 are arranged in a pattern. For example, a first area of the lower layer 51 includes one or more rows or lines of the one or more openings 58a; and a second area of the lower layer 51 also includes one or more rows or lines of the one or more openings 58b. It should be noted that the lower layer 51 is configured to fit within the raised edges 32 of the base 31 of the transport platform 30. To achieve a tighter fit within the base 31, the second side 54b of the lower layer 51 includes an extension 61 that is adapted to fit within the cutout portion C3 along the edge of the base 31 of the transport platform 30. The extension 61 restricts movement of the adapter plate 50 in the x and y direction. Lastly, it should be noted that the first side 54a of the lower layer 51 may include a cutout portion C5 adapted to provide access to the hole 34d located in the cutout portion C4 of the base 31. In this manner, the hole 34d in the base 31 remains available for use, despite the presence of the adapter plate 50, in the event the user wishes to use the one or more holes 34b, 34d for attaching items, such as the straps S1, S2 shown in FIG. 20.

Figure 18:
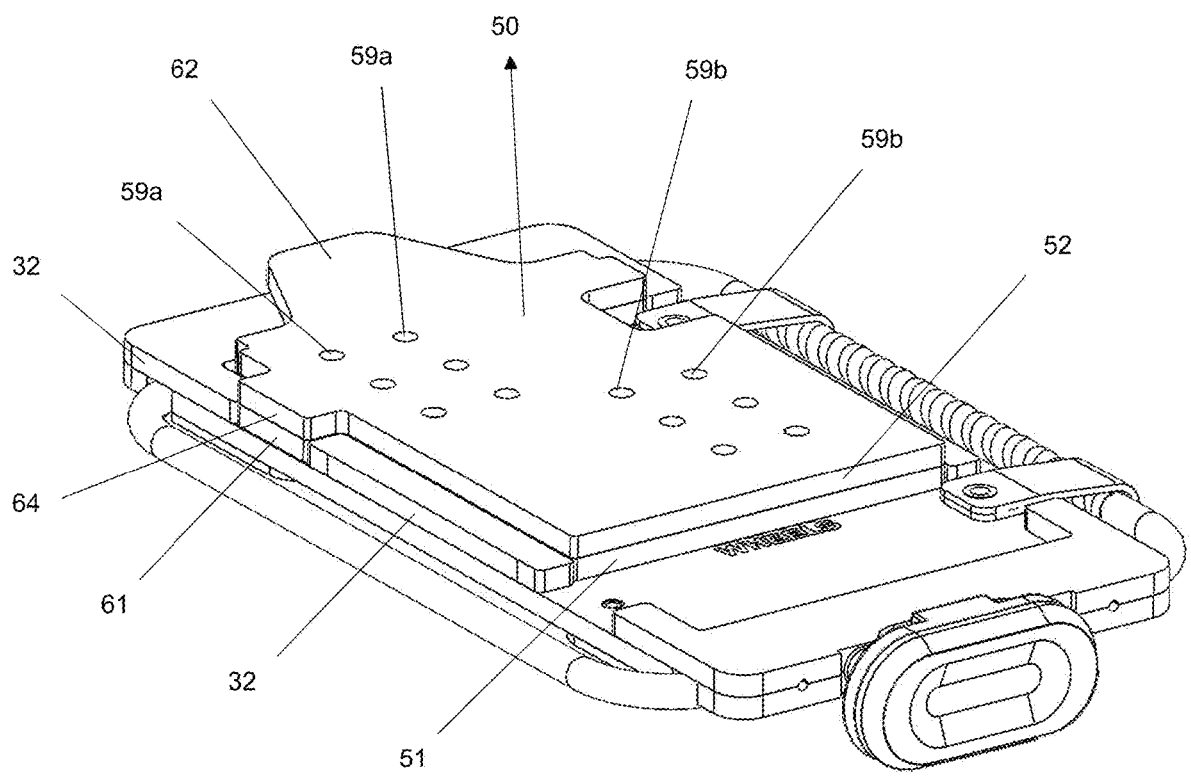
FIG. 18 shows a perspective view of the container adapter plate for use with an attachment apparatus and/or system for securely attaching objects to a bicycle frame, in accordance with principles of the present disclosure.

The upper layer 52, on the other hand, includes a first side 55a and a second side 55b that are opposite to each other; and a first end 56a and a second end 56b that are opposite to each other. The upper layer 52 also includes one or more openings 59a, 59b, each of which are adapted to receive the T-nut 57a (or similar fastening means) which, in turn, is adapted to interact with the screw or fastener 57b. As shown in FIG. 18, the one or more openings 59a, 59b in the upper layer 52 are arranged in a pattern. For example, a first area of the upper layer 52 includes one or more rows or lines of the one or more openings 59a; and a second area of the upper layer 52 also includes one or more rows or lines of the one or more openings 59b. It should be noted that the rows or lines of the one or more openings 59a in the first area of the upper layer 52 align with the rows or lines of the one or more openings 58a in the first area of the lower layer 51. Similarly, the rows or lines of the one or more openings 59b in the second area of the upper layer 52 align with the rows or lines of the one or more openings 58b in the second area of the lower layer 51. As such, the pattern of the one or more openings 58a, 58b, 59a, 59b, provides different locations in which the box or container 60 can be mounted on the adapter plate 50 via the T-nuts 57a and screw or fastener 57b.

Figure 19:
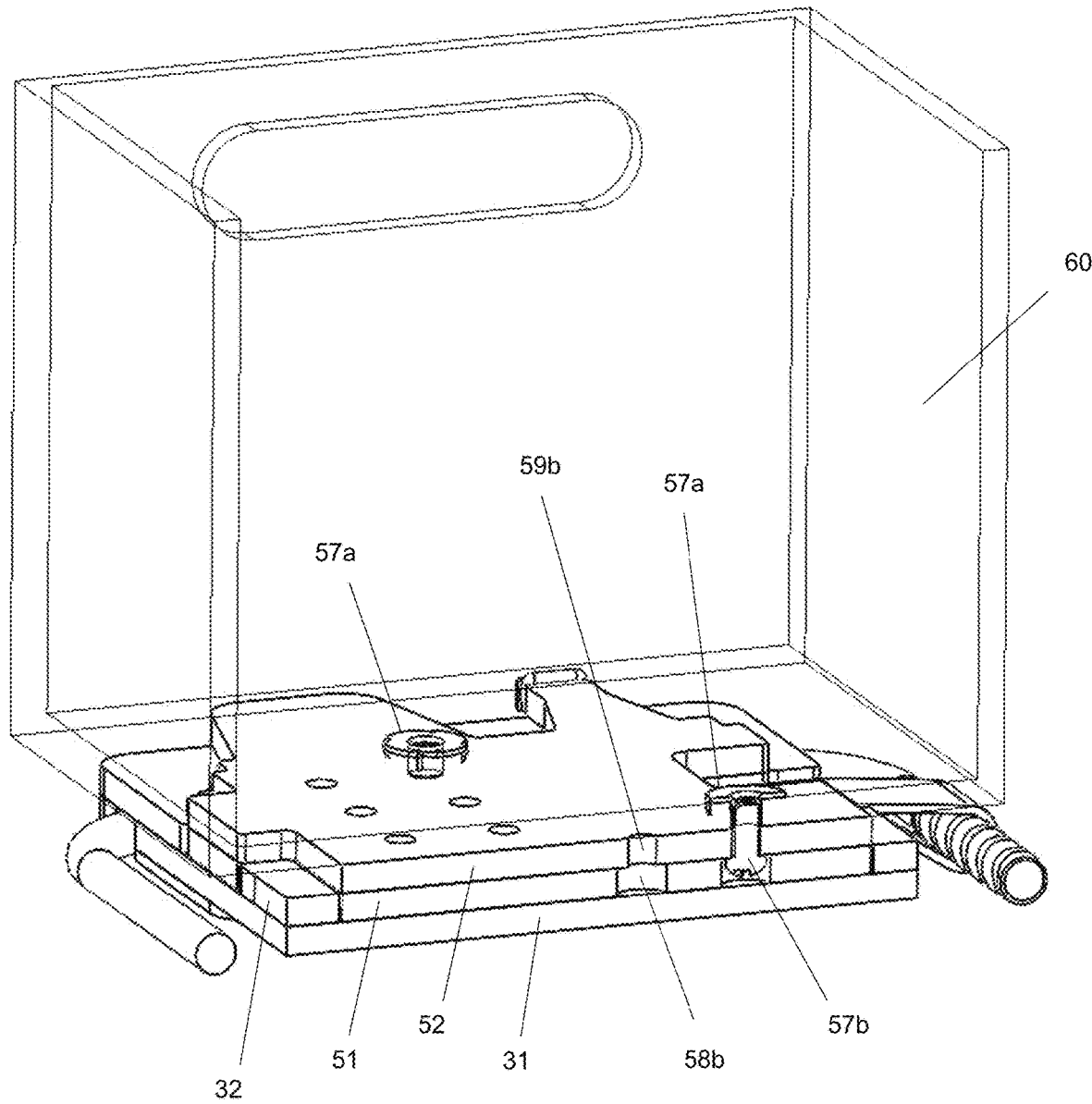
FIG. 19 shows a cross-section view of the container adapter plate and the transport platform component of the attachment apparatus and/or system for securely attaching objects to a bicycle frame, in accordance with principles of the present disclosure.
Figure 20:
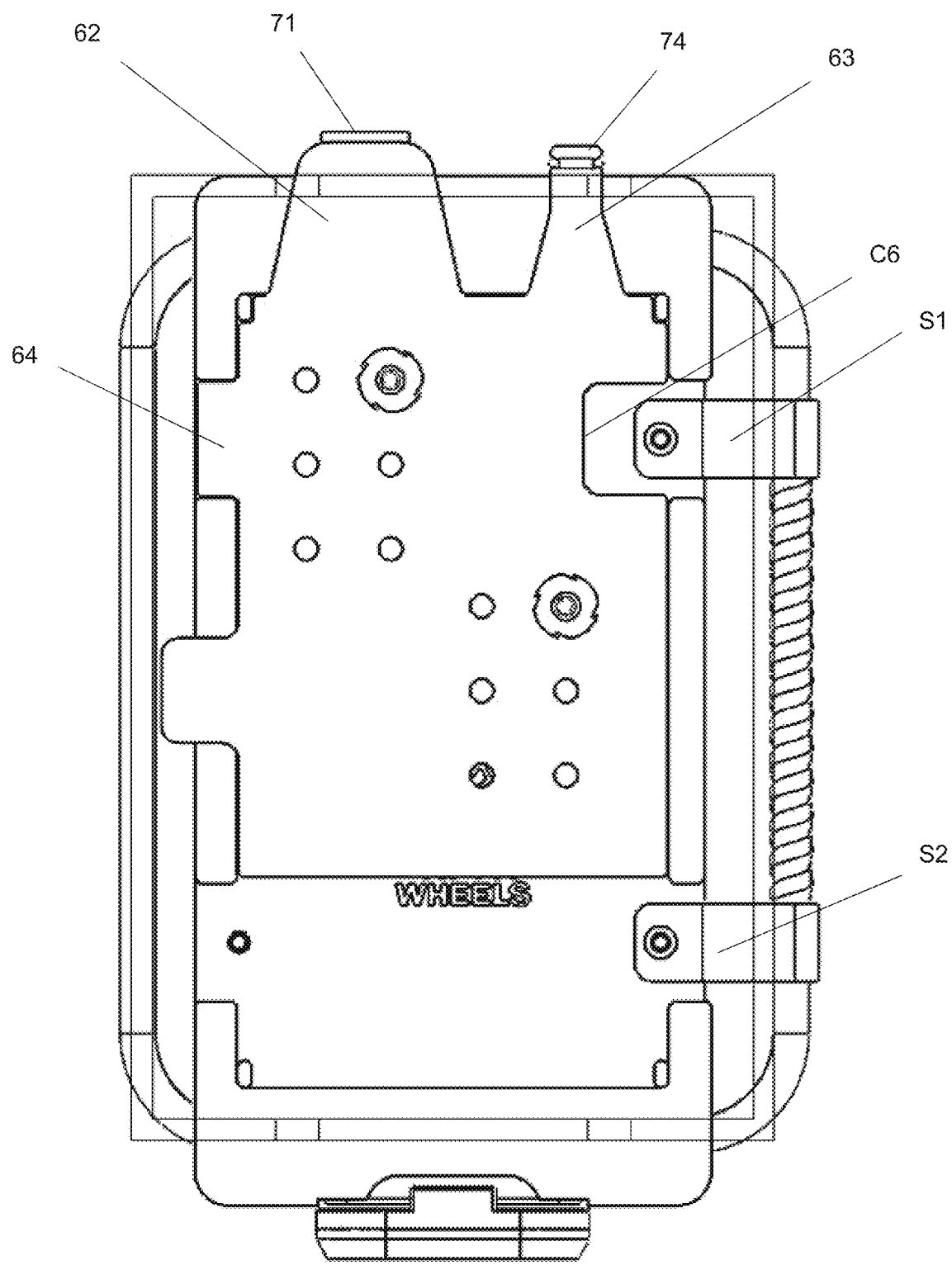
FIG. 20 shows a top view of the container adapter plate for use with an attachment apparatus and/or system for securely attaching objects to a bicycle frame, in accordance with principles of the present disclosure.
Figure 21:
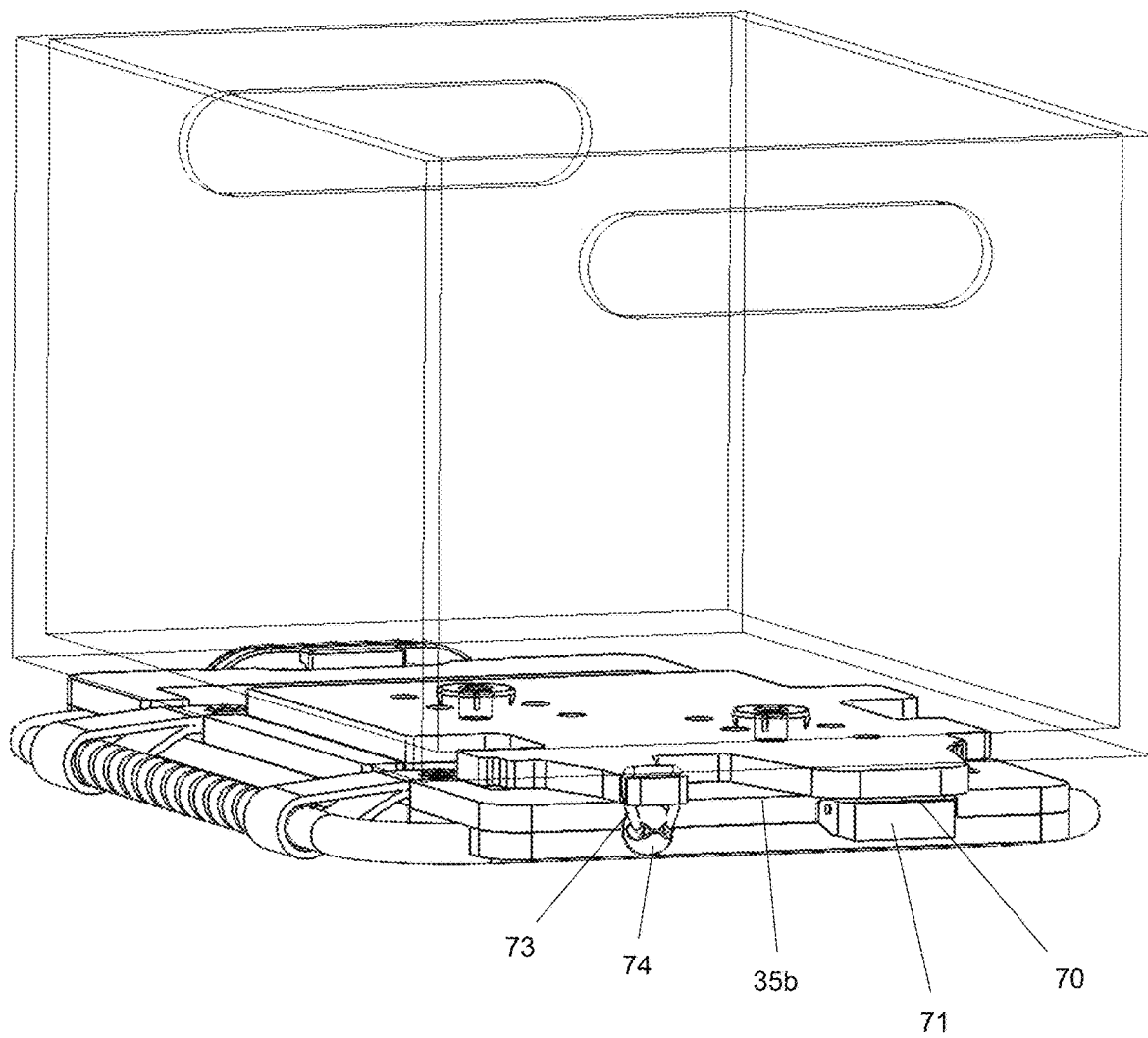
FIG. 21 shows the mounting mechanism for the container adapter plate for use with an attachment apparatus and/or system for securely attaching objects to a bicycle frame, in accordance with principles of the present disclosure.

As noted above, the upper layer 52 is glued or fastened on top of the lower layer 51 which, in turn, is fitted within the raised edges 32 of the base 31 in the platform 30. To achieve a tighter fit with the platform 30, the upper layer 52 includes a first extended portion 62 adapted to extend over the raised edge 32 on the second end 35b of the base 31. The bottom of the first extended portion 62 comprises a mechanical or electromechanical latching mechanism that is adapted to lock or secure the upper layer 52 with the base 31 of the transport platform 30. For example, a magnet catch plate 70 may be included on the bottom of the first extended portion 62 that attaches to a magnet 71 attached to the second end 35b of the base 31b, as shown in FIGS. 20 and 21. Moreover, the upper layer 52 may also include a second extended portion 63 adapted to extend over one of the raised edges in the base of the transport platform 30, as show in FIGS. 20 and 21. A second latching mechanism, such as a cable clip (comprising a cable 73 and clip 74) may be used to secure the second extended portion 63 on the upper layer 52 with the second end 35b of the base 31 to ensure that the box or container 60 is fully secured. In this manner, the adapter plate 50 can be tightly secured to the platform 30; and the rider of the bicycle can control movement of the box or container 60 along the z axis. These connections keep the container from moving in the z-direction. Overall, the box or container 60 is secure and yet the rider can easily and quickly remove it. The first extended portion 62 and the second extended portion 63 may have a triangular shape, as shown in FIGS. 19-21, but may also have other shapes, such as being flush with the raised edge 32 on the second end 35b of the base 31.

The second side 55b of the upper layer 52 also includes an extension 64 that is adapted to cover the extension 61 of the lower layer 51 which, in turn, is fitted within the cutout portion C3 along the edge of the base 31 of the transport platform 30. As such, the extension 64 also restricts movement of the adapter plate 50 in the x and y direction. Lastly, just like the lower layer 51, the upper layer 52 may also include a cutout portion C6 adapted to provide access to the hole 34d located in the base 31. In this manner, the hole 34d in the base 31 remains available for use, despite the presence of the adapter plate 50, in the event the user wishes to use the one or more holes 34b, 34d for attaching items, such as the straps S1, S2 shown in FIG. 20.

As previously noted, each of the lower layer 51 and the upper layer 52 includes one or more rows of openings 58a, 58b (in the lower layer) and 59a, 59b (in the upper layer) that align with each other and are adapted to receive the T-nut 57a along with the screw or fastener 57b. The purpose of the T-nut 57a and screw or fastener 57b is to secure or attach the box or container 60 to the adapter plate 50. To achieve this, the bottom portion of the box or container 60 includes a first area comprising one or more rows or lines of openings that align with the rows or lines of the one or more openings 58a in the first area of the lower layer 51; and with the rows or lines of the one or more openings 59a in the first area of the upper layer 52. Likewise, the bottom portion of the box or container 60 also includes a second area comprising one or more rows or lines of openings that align with the rows or lines of the one or more openings 58b in the second area of the lower layer 51; and with the rows or lines of the one or more openings 59b in the second area of the upper layer 52. Depending on which of these openings the T-nuts and screws are placed, the box or container 60 can be moved in the x and y direction and be either closer to or farther from the rider of the bicycle; or closer to or farther from the rail 33 of the platform 30. FIG. 20 shows the arrangement of the one or more openings that the rider of the bicycle has at its disposal to align the box or container 60 on the upper layer 52 of the adapter plate. In this sample configuration, there is adjustability for three positions front-to-back and two positions side-to-side.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in any future claim.

What is claimed is:

1. A container adapter plate for use with an attachment apparatus for securely attaching objects to a bicycle frame, comprising:
    a lower layer;
    an upper layer;
    wherein the lower layer and the upper layer are adhered to each other;
    wherein the lower layer includes a first end and a second end that are opposite to each other, and a first side and a second side that are opposite to each other;
    wherein the lower layer includes one or more openings, each of which receive a T-nut and a corresponding screw;
    wherein the one or more openings in the lower layer are arranged in a pattern;
    wherein the lower layer fits within a bicycle transport platform that comprises a base with raised edges;
    wherein the raised edges in the base of the transport platform include one or more cutout portions;
    wherein the second side of the lower layer includes an extension that fits within one of the cutout portions of the transport platform;
    wherein the upper layer includes a first side and a second side that are opposite to each other, and a first end and a second end that are opposite to each other;
    wherein the upper layer includes one or more openings that receive the T-nut and the corresponding screw;
    wherein the one or more openings in the upper layer are arranged in a pattern;
    wherein the upper layer includes a first extended portion that extends over one of the raised edges in the base of the transport platform; and
    wherein the first extended portion of the upper layer comprises a latching mechanism to lock the upper layer with the base of the transport platform.

2. The container adapter plate of claim 1, wherein the base of the transport platform includes:
    a first end and a second end that are parallel to each other and have the same length, a first side and a second side that are parallel to each other and have the same length, and wherein the length of the first and second sides of the base is greater than the length of the first and second ends of the base; and
    wherein the cutout portions in the base include at least one hole that crosses through the surface of the base.

3. The container adapter plate of claim 2, wherein the first side of the lower layer includes a cutout portion adapted to provide access to the at least one hole in one of the cutout portions of the base.

4. The container adapter plate of claim 1, wherein the one or more openings in the upper layer are aligned with the one or more openings in the lower layer.

5. The container adapter plate of claim 1, wherein the pattern in which the one or more openings in the lower layer are arranged comprises a first area of the lower layer having one or more rows of the one or more openings, and a second area of the lower layer having one or more rows of the one or more openings.

6. The container adapter plate of claim 1, wherein the pattern in which the one or more openings in the upper layer are arranged comprises a first area of the upper layer having one or more rows of the one or more openings, and a second area of the upper layer having one or more rows of the one or more openings.

7. The container adapter plate of claim 1, wherein the pattern in which the one or more openings in the lower layer are arranged comprises a first area of the lower layer having one or more rows of the one or more openings, and a second area of the lower layer having one or more rows of the one or more openings, and
    wherein the pattern in which the one or more openings in the upper layer are arranged comprises a first area of the upper layer having one or more rows of the one or more openings, and a second area of the upper layer having one or more rows of the one or more openings, and
    wherein the rows of the one or more openings in the first area of the upper layer align with the rows of the one or more openings in the first area of the lower layer, and
    wherein the rows of the one or more openings in the second area of the upper layer align with the rows of the one or more openings in the second area of the lower layer.

8. The container adapter plate of claim 1, wherein the second side of the upper layer includes an extension that fits whin one of the cutout portions of the transport platform.

9. The container adapter plate of claim 1, further comprising a box or container having a bottom portion with one or more openings that are aligned with the one or more openings in the upper layer and the one or more openings in the lower layer.

10. The container adapter plate of claim 1, wherein the latching mechanism to lock the upper layer with the base of the transport platform comprises a catch plate on the bottom of the first extended portion and a magnet attached to the second end of the base.

11. The container adapter plate of claim 1, further comprising a second extended portion on the upper layer that extends over one of the raised edges in the base of the transport platform.

12. The container adapter plate of claim 11, further comprising a second latching mechanism to secure the second extended portion on the upper layer with the second end of the base.

13. The container adapter plate of claim 12, wherein the second latching mechanism is a cable clip.

* * * * *